US007680413B2

(12) United States Patent  
Greenspan

(10) Patent No.: US 7,680,413 B2
(45) Date of Patent: Mar. 16, 2010

(54) OPTICAL NETWORK MONITORING SYSTEM AND METHOD

(75) Inventor: Daniel Greenspan, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 943 days.

(21) Appl. No.: 11/138,235

(22) Filed: May 26, 2005

(65) Prior Publication Data

US 2006/0269290 A1    Nov. 30, 2006

(51) Int. Cl.
 *H04B 10/00* (2006.01)
(52) U.S. Cl. ...................................................... 398/40
(58) Field of Classification Search .................. 398/25, 398/40

See application file for complete search history.

(56) References Cited

U.S. PATENT DOCUMENTS

| | | | | |
|---|---|---|---|---|
| 5,067,787 | A * | 11/1991 | Gillham et al. | 385/50 |
| 5,986,782 | A * | 11/1999 | Alexander et al. | 398/26 |
| 6,917,731 | B2 * | 7/2005 | Bennett et al. | 385/15 |
| 7,039,318 | B2 * | 5/2006 | Graves | 398/81 |
| 7,180,900 | B2 * | 2/2007 | Williamson et al. | 370/395.61 |
| 2003/0185486 | A1 * | 10/2003 | Bennett et al. | 385/15 |
| 2004/0052521 | A1 * | 3/2004 | Halgren et al. | 398/19 |
| 2004/0208507 | A1 | 10/2004 | Saunders et al. | |
| 2004/0208534 | A1 * | 10/2004 | Boertjes et al. | 398/38 |

* cited by examiner

*Primary Examiner*—Shi K Li
(74) *Attorney, Agent, or Firm*—Trellis IP Law Group, PC

(57) ABSTRACT

An optical network monitoring system and method provide for optical network diverting or further legal intercept, operational and/or other monitoring of general or specific transmission information that may be transmitted via a network optical branch. In one embodiment, a splitter within a diverter assembly diverts a portion of a received transmission signal (strength) to an optical receiver or re-transmitter, and outputs a further portion of the signal via a diverter assembly output or further via a re-transmitter or booster. In another embodiment, the splitter is generally matched to the receiver. A further embodiment provides for transferring the diverted portion to a monitoring assembly with which the diverting assembly may be matched, disposed or otherwise integrated, and which may provide for configuring the diverting assembly. The monitoring assembly may further provide for conducting monitoring processing, which may include receiving additional information from a service host or other system component, processing the diverted portion, additional information or both, and/or using the additional information for processing the diverted portion. The monitoring assembly may still further receive a monitoring request from a monitoring requester or other authorization authority that may include monitoring processing criteria, and may transfer designated content to a designated receiver.

19 Claims, 15 Drawing Sheets

OPTICAL NETWORK MONITORING SYSTEM AND METHOD

BACKGROUND OF THE INVENTION

1. Field of Invention

The present invention relates in general to the field of computer networks and more specifically to computer networks including optical communication couplings.

2. Description of the Background Art

Optical communication links continue to present an attractive network communication coupling option within a network system—especially for relatively high speed and low cost point-to-point connections. However, monitoring such optical networks may become particularly problematic in view of recent developments.

Traditionally, network monitoring has encompassed verification or analysis of network operations, such as throughput, error rate, and so on. As with wire networks, such monitoring of optical networks is typically conducted by simply tapping into electrically available user communication traffic at a service provider server.

The World Trade Center bombing and other recent events are, however, leading to a greater willingness of several jurisdictions, e.g., the U.S. and E.U., to enact lawful intercept legislation. The lawful intercept legislation is expected to enable a law enforcement agency to stealthfully monitor certain network communications of persons subject to an applicable warrant or other legal authorization, and to further require network service providers to facilitate such legal intercept type network monitoring. Facilitating the provision of related information or processing of applicable information may also be required.

Traditional network monitoring approaches may, however, lose applicability in conjunction with facilitating legal intercept or other network monitoring especially in the case of optical networks. For example, data that may otherwise be received and monitored by a service provider server or other network component may be subject to modification, whether through tampering, side effects of the network component operation or other causes, elsewhere in the network, and thus insufficient for legal intercept purposes. Such received data may also exclude applicable data that is not received by the monitoring component. Cutting an applicable optical network data path and attaching an off-the-shelf optical splitter for connection to some monitor at some point may also be problematic. For example, assuring that the cut-in will provide sufficient monitor signal strength despite tie-in losses may require diverting 40 percent or more of an optical signal transmission. Unfortunately, the 60 percent or less optical signal level that remains for completing the transmission may be insufficient for a particular optical coupling path or may render the monitoring (e.g., legal intercept) discoverable by a monitored suspect. To make matters more difficult, a misconnection may well result in diverting the 60 percent signal and transmitting the 40 percent signal. Worse yet, the misconnection may result in initial, intermittent or other discontinuous transmission that may hinder discovery of the error, among other problems.

Accordingly, there is a need for optical network monitoring systems and methods that enable one or more of the above and/or other problems to be avoided.

BRIEF DESCRIPTION OF THE DRAWINGS

FIGS. 3d1 and 3d2 are flow diagrams illustrating, in greater detail, still further examples of a diverter assembly of FIGS. 1a and 1b, according to an embodiment of the invention;

FIG. 8b is a flowchart illustrating a continuation of the method of FIG. 8a.

DETAILED DESCRIPTION OF EMBODIMENTS OF THE INVENTION

Figure 1A:
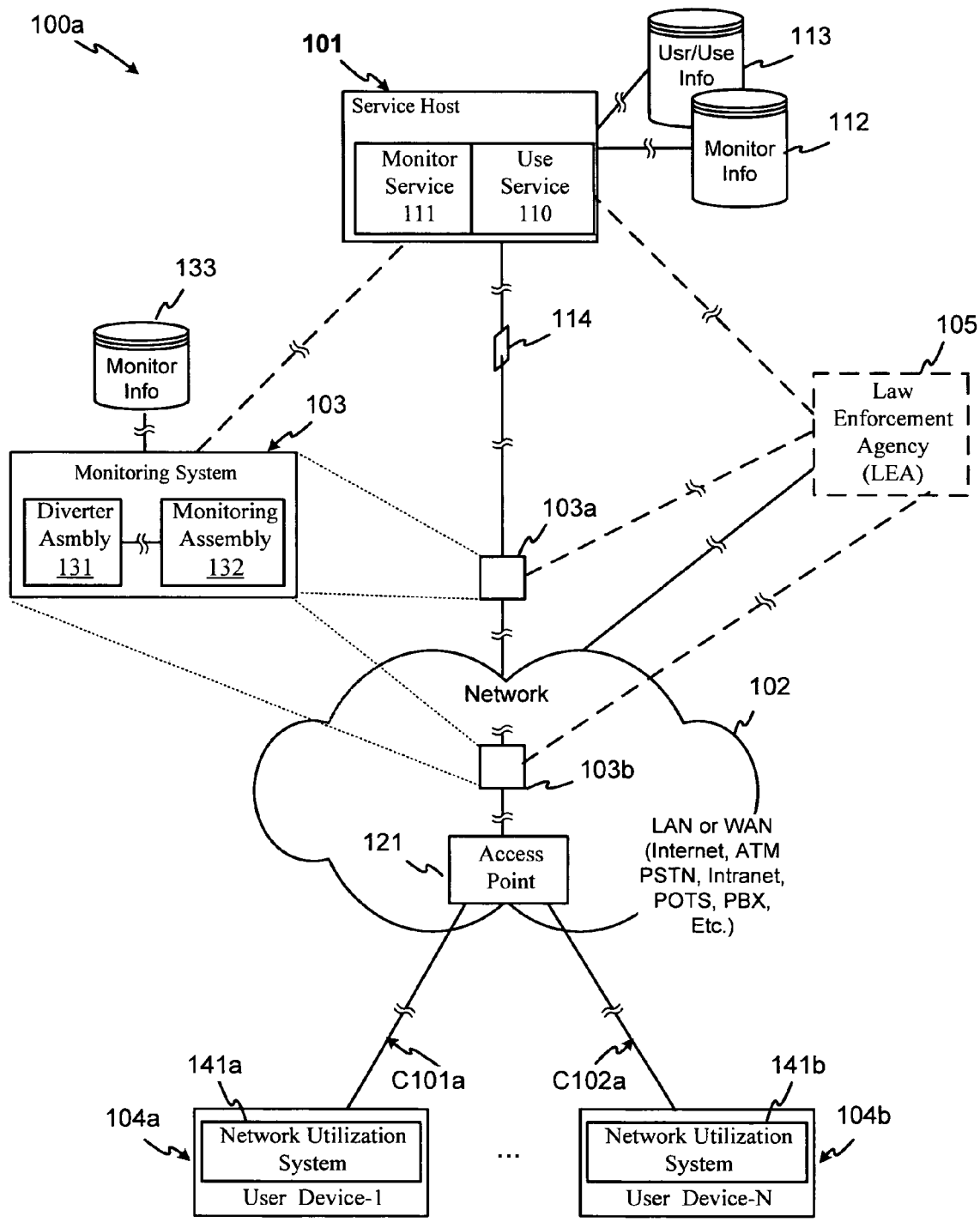
FIG. 1a is a flow diagram illustrating a monitoring enabled network system according to an embodiment of the invention.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, settop box or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain and store the computer program for use by or in connection with the instruction execution system, apparatus, system or device. The computer readable medium can be, by way of example only but not by limitation, a semiconductor system, apparatus, system, device, or computer memory. The computer readable medium may have suitable instructions for synchronously presenting multiple program ID streams, such as on a display screen, or for providing for input or presenting in accordance with various embodiments of the present invention.

Referring now to FIG. 1A, there is seen a flow diagram illustrating a monitoring enabled network system (monitored network) according to an embodiment of the invention. Monitored network 100a broadly provides for conducting operational, transmission (content) or related monitoring in which at least one transmission made via an optical coupling may be monitored.

In one embodiment, an optical coupling forms one direction of a network communication path (branch) of a single or composite network including the optical coupling (optical network). A monitoring system further is coupled to the optical branch that provides for monitoring a portion of at least one transmission via the optical branch. Monitoring may, for example, include generally diverting, capturing and reporting (e.g., transferring) an optical transmission portion or "content", or capturing and reporting selectable content (e.g., relating to a particular user, optical network portion, and so on). Monitoring may further include capturing and reporting general or selectable transmission/operational characteristics or decrypting, reformatting or otherwise performing monitoring related processing the content/characteristics, and reporting the processed content/characteristics. Monitoring may also include the monitoring system or a further monitored system component capturing and reporting other, preferably related identifying or other information relating to the content or characteristics (non-content information). It will become apparent that more than one monitoring system may further be utilized in a more centralized or more distributed manner, for example, to separably or coordinatedly monitor bidirectional transmission, different active/inactive available paths.

Note that the term "or" as used herein is intended to include "and/or" unless otherwise indicated or unless the context clearly dictates otherwise. The term "portion" as used herein is further intended to include "in whole or contiguous or non-contiguous part" which part can include zero or more portion members, unless otherwise indicated or unless the context clearly dictates otherwise. The term "multiple" as used herein is intended to include "two or more" unless otherwise indicated or the context clearly indicates otherwise. It should also be understood that the term "diverted" refers to copying, duplicating or otherwise monitoring available information (e.g., an optical signal), the content of which (e.g., header, code, data, and so on) may continue "un-diverted" to its destination.

As shown in FIG. 1A, a monitored network 100a in one embodiment comprises at least intermittently communicatingly couplable components including service host 101, storage 112, 113, one or more networks (i.e., or sub-networks) 102, monitoring system 103 and one or more participant devices 104a-b. It will become apparent that one or more of such components may become coupled at the same or different times as may be suitable for providing the operations discussed herein in accordance with the requirements of a particular application.

Service host 101 in one embodiment includes one or more intra-network or other end device computing systems that is/are capable of conducting or otherwise facilitating an interaction by or between one or more user devices (e.g., 104a, 104b), users of such devices or some combination thereof. Service host 101 is, in the present embodiment, communicatingly coupled via a suitable network 102, to user devices 104a, 104b and other system 100a components, and may be further communicatingly coupled to monitoring system 103 a monitoring authority (e.g., 105), further devices or some combination via a suitable direct, secure or other coupling. (Service host 101 may also be coupled to monitoring system 103 or a designated monitoring information destination, such as law enforcement agency 105 via network 102, directly, via a suitable private/more secure connection or otherwise more directly, or some combination thereof.) Service host 101 may, for example, include but is not limited to a network server or other device (i.e., or process) that provides or facilitates single-user or multiple-user network access, file transfer, messaging, email, storage, backup, application/data execution, downloading/uploading, or other information transfer utilization. Service host 101 may also include but is not limited to a server or other device that provides for multiple user interaction, including, for example, a POTS, cellular, satellite, or other communication provider home office or switching device, a live messaging, meeting, calendaring, education, IP phone, conferencing or other multiple user application facilitator, or may provide for facilitating some combination of single and multiple user information transfer.

Service host 101 also provides for storing system 100a, user, user device or other information other than ongoing-transmission information (hereinafter, non-content information), for example, in storage 113. Such information may, for example, be utilized or reported in conjunction with monitoring operation. Non-content information may, for example, include but is not limited to: network configuration, path, device identification, facilitating or other intra or inter network information; user identification, preference, location, use, group, interaction, participant or other user/use related information; user device, coupling, utilization, identification or other user device related information; and so on, or some combination thereof. Non-content information may also include content interpretation information that may, for example, be used to facilitate content verification, identification, reconstruction, processing or other content interpretation. Content interpretation information may, for example, include but is not limited to format, configuration or security information, such as one or more of passwords, encryption keys, algorithms, registries, volumes, and so on.

Within service host 101, use service engine 110 provides for conducting the aforementioned facilitating of single or multiple user interaction, information utilization or other information transfer, and may, for example, include one or more of mail or application servers, applications or other suitable devices or computer code for conducting such information transfer. Use service engine 110 may further provide for determining and storing the aforementioned non-content information, and may, for example, include one or more suitable registration, configuration, packet header analyzing or other suitable device(s) or computer code for conducting such operation.

For example, a user of user device 104a may initiate network services via a use service engine of a local, Internet or other network service provider, application provider or other service host, or may merely access information via a suitable service host use service engine. The use service engine may respond by polling the transmission (e.g., packet header), user/user device (e.g., for registration information) or transfer cookies or other information to a user device that may later be retrieved or otherwise provided to service host 101 for later use, among other suitable mechanisms. The use service engine may further store initial or later determined user/device information for identification, registration, statistics, records, billing or other purposes that may or may not be conducted specifically for facilitating monitoring operation. The use service engine may also facilitate user interaction or other information transfer in conjunction with a single or multiple user access corresponding to the service provided by or via the use service engine. (It will be appreciated that storage, processing or other resource requirements for conducting or otherwise facilitating particular user interactions are known or otherwise readily discernable by those skilled in the art.)

Monitor service engine 111 provides for conducting control, configuration or information transfer in conjunction with system 100 monitoring system operation.

In one embodiment, monitor service engine 111 is operable in conjunction with legal intercept type monitoring, and responds to general or specific monitoring system 103 information requests. (A general request may, for example, relate to transmission portions that may be transferred at various or specific times, while a specific request may, for example, relate to one or more particular users, uses, monitored system components, and so on.) In a more specific embodiment, monitor service engine 111 transfers to monitoring system 103 non-content user or user device information on a per transmission or some other one-to-n-time, continuous, intermittent or other determinable, typically predetermined, basis. The information may, for example, include the aforementioned identification, registration or interaction information, transmission related encryption key(s) or other verification, translation or other security information (e.g., that may not be otherwise ascertainable via transmission monitoring), and so on, or some combination thereof. Monitor service engine 111 may further provide for storing (e.g., via storage 112) or monitoring configuration, security, non-content or other information. See, for example, FIG. 4A.

(It will be appreciated that various security mechanisms may be employed to assure limited or secure access to legal intercept monitoring request or other intercept related information, many of which are otherwise used in other applications. Such legal intercept or other security mechanisms that may be used are generally illustrated by firewall 114 so as not to obscure various aspects of the invention. The specific security mechanisms, mechanism placement, operation, and so on may vary in accordance with the requirements of a particular implementation.)

In another embodiment, monitor service engine 111 is operable in conjunction with operational type monitoring, and responds to general or specific monitoring system 103 information requests. In a more specific embodiment, monitor service engine 111 provides to monitoring system 103 configuration information for conducting particular operational monitoring. Monitoring system 103 may, for example, capture and report intercepted transmission content, or further process or coordinate use information provided by monitor service engine 111 (e.g., to determine quality-of-service provided generally or to a premier or other customer class). However, processing/coordinating may be also be conducted by monitor service engine 111 (e.g., in conjunction with information returned by monitoring system 103 or other system 110a components), or some combination may be utilized in accordance with the requirements of a particular implementation. Monitor service engine 111 may further provide for secure access to monitored or other information, additional security may be used (e.g., see above) or some combination may be employed. See, for example, FIG. 4B.

Monitoring system 103 provides for monitoring general or specific transmission information (content) that may be transferred by a user device, service host or other device via a corresponding optical network branch of network 102 onto which at least a portion of monitoring system 103 is disposed. More specifically, monitoring system 103 provides for diverting one or more optical transmission portions that are otherwise being transmitted to some destination via a corresponding network branch, while preferably concurrently passing or further re-transmitting a remaining (non-diverted) transmission portion. The diverted transmission portion ("diverted content" or "content") may, for example, include a predetermined signal level of the entire signal or one or more wavelengths thereof.

Monitoring system 103 further provides for conducting one or more monitoring operations on the diverted content. Monitoring operations in one embodiment include determining whether diverted content corresponds to content that is to monitored (designated content), and if so, transferring the designated content to one or more designated content receivers. In another embodiment, such monitoring may include determining whether content is to be diverted, and if so, diverting or further transferring the designated content. Designated content may, for example, include content corresponding to one or more of particular users, user devices or other entities, time periods and other typically predetermined criteria. A designated content receiver may, for example, include one or more of law enforcement agencies, monitor data stores, and so on (e.g., in conjunction with legal intercept type, operational or other monitoring, or some combination thereof).

Monitoring operations may also include associating designated content with non-content information, for example, provided by a service host or other device (e.g., see above), processing the diverted content or transferring processed content to one or more designated content receivers. Non-content information may, for example, include one or more of intercept related information (IRI), time stamp, user, user device, service level, other identification, security/configuration information, or other information in conjunction with corresponding ones of legal intercept type, operational or other monitoring, or some combination thereof. Further processing may, for example, include but is not limited to one or more of decrypting, re-formatting or otherwise modifying content or non-content information, thereby facilitating corresponding ones of legal intercept, operational or other monitoring or some combination thereof.

One or more monitoring systems may also be in various positions within system 100a, in accordance with the requirements of a particular application. In one embodiment, monitoring of network access by a user device or user of such user device (e.g., 104a) may be facilitated by disposing monitoring system 103a on a network branch along a transmission path coupling the user device and a service host providing such network access. In another embodiment, monitoring system 103a may also be disposed along a path (i.e., or backup path or some path combination) coupling user device 104a with one or more network resources other than service host 101. In a further embodiment, a monitoring system 103b may be disposed on a network branch coupling an access point of one or more user devices with the network as may be suitable for conducting monitoring in accordance with a particular application.

Figure 1B:
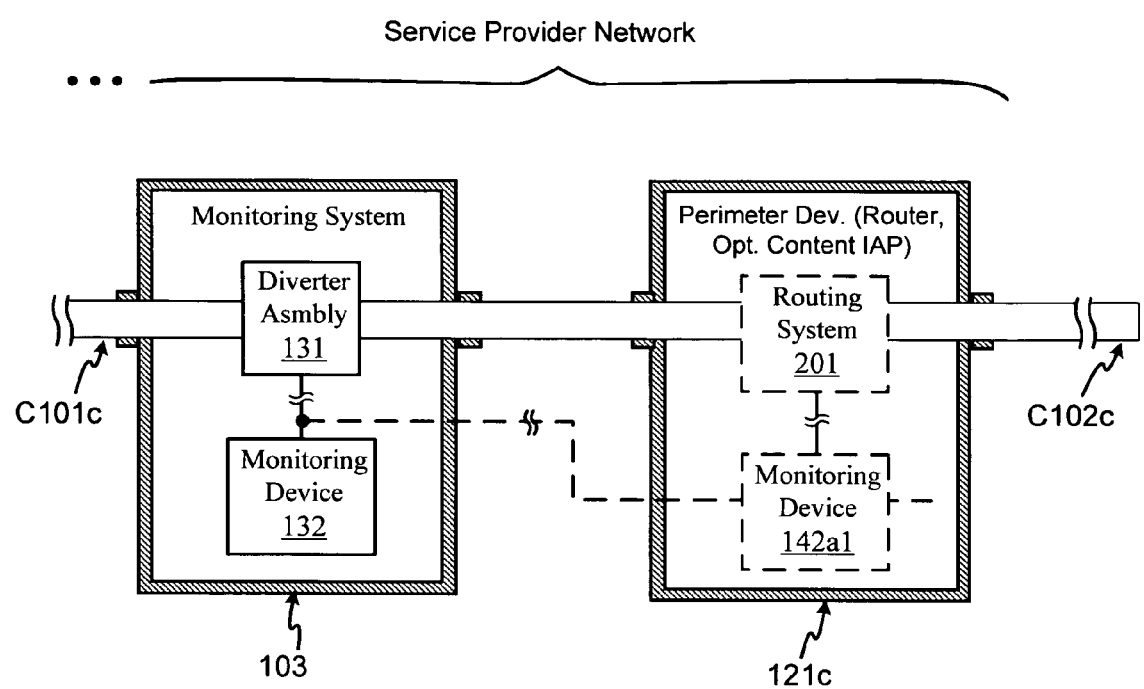
FIG. 1b is a flow diagram illustrating another monitoring enabled network system according to an embodiment of the invention.
Figure 1C:
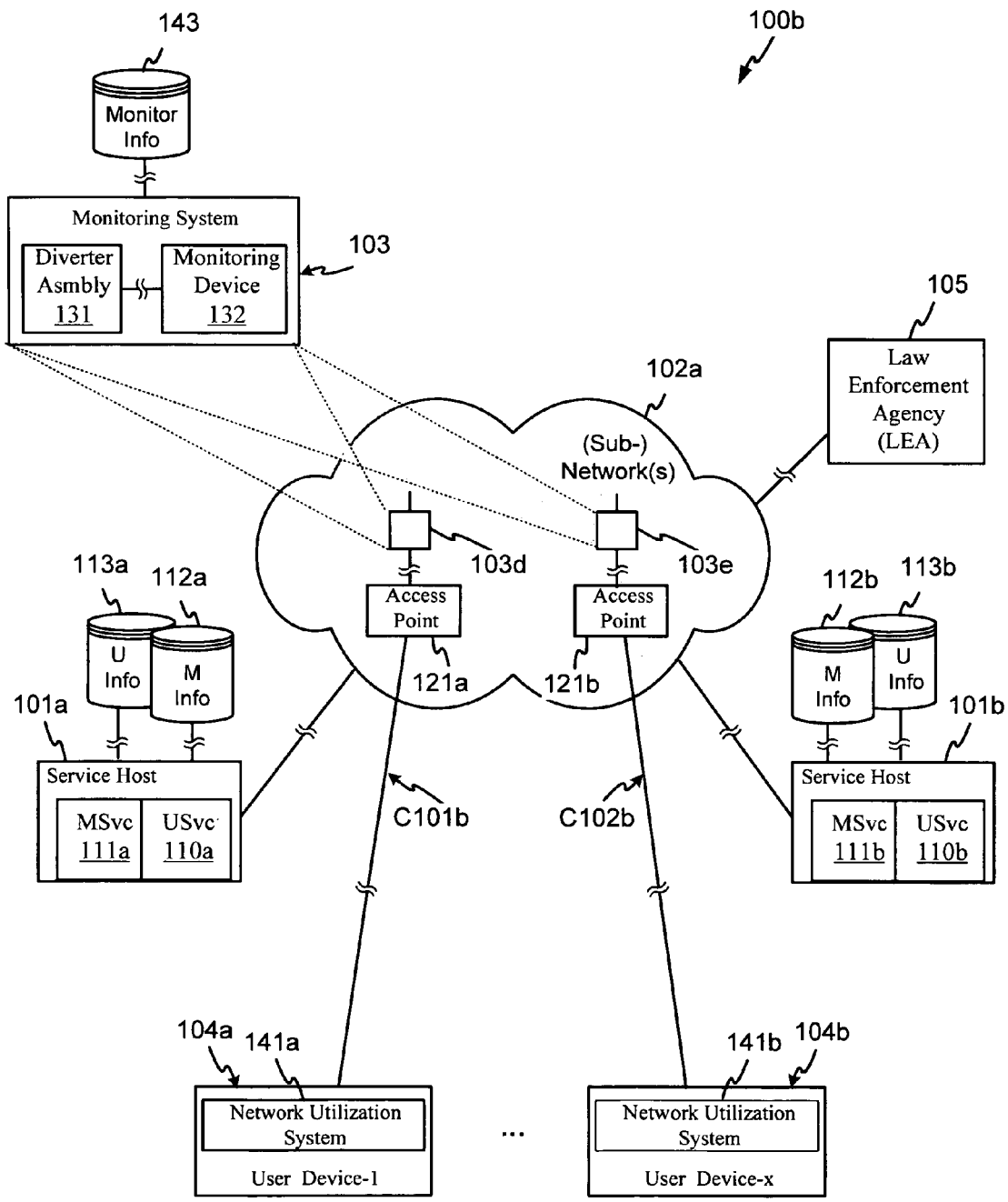
FIG. 1c is a flow diagram illustrating a monitoring system configuration according to an embodiment of the invention.

FIGS. 1B and 1C illustrate other embodiments in which monitoring may be conducted in conjunction with interaction that may include one or more of multiple users, transmission paths and networks/sub-networks. The embodiment of FIG. 1B, for example, disposes one or more monitoring systems on a network branch or other communication path 101c at or near the perimeter of a service provider network (alone or in addition to other monitoring systems that may be used). The service provider network perimeter may, for example, correspond with an intra or extra network optical coupling to a device (e.g., 121c) forming an end device that may be controllable by a service provider, such as a router, gateway or switch. In this example, such placement may enable a substantial number, if not all, single or multiple user interactions extending outside the service provider network perimeter to be monitored (e.g., where one or few inter-(sub-)network access points provide extra perimeter communication). The FIG. 1B embodiment also shows how various integrations of monitoring system components with the network or other communication system components may also be used. More specific embodiments may, for example, include one or more L2 or L3 boundaries.

FIG. 1C illustrates another embodiment in which monitoring of a multiple user interaction may be less effectively conducted via a single (sub-)network or service host access point. For example, a legal intercept type monitoring of a conventional phone call, IP-phone call or combined call (e.g., being routed between the two at least one endpoint), conference or some other multiple user interaction occurring between two or more users utilizing different (sub-)networks may be conducted. In such cases, conducting monitoring within each (sub-)network may better enable non-content, content detectable interception or other tampering, interruption, or other information to be more readily monitored. Such an embodiment may also be used to conduct more complete connection monitoring, for example, to better assure quality of service, identify tampering or operational problems, and so on, or some combination. It will become apparent that more complete, closer-to-source, closer-to-service host or other monitoring, or some monitoring configuration combination may be desirable in accordance with the requirements of a particular application.

Within monitoring system 103, diverting assembly 131 provides for passing or re-transmitting non-diverted transmission portions and for transferring raw or re-transmitted diverted content or designated diverted content to monitoring assembly 132. See, for example, FIGS. 3A through 3C. Monitoring assembly 132 provides for conducting monitoring operations on diverted content received from diverting assembly 131 (e.g. see above), or may further provide for controlling diverting assembly operation (e.g., enabling, disabling or other modifying a diverting assembly state). See, for example, FIGS. 3a through 4B and FIGS. 5 through 6.

Of the remaining meeting system 100a (and 100b-c) components, networks 102 may, for example, include one or more of suitable fixed or reconfigurable physical or virtual networks, i.e., or sub-networks, including local area networks (LANs), private networks, wide area networks (WANs, e.g., the Internet), and so on, or some combination. Firewall 114 is illustrative of a wide variety of security mechanisms, such as firewalls, encryption, fire zone, compression, secure connections, one or more of which may be used in conjunction with various system 100a-c components. Many such mechanisms are well known in the computer and networking arts. User devices 104a and 104b may include any suitable devices for coupling to a suitable network and conducting applicable communication as needed (e.g., one or more of conventional, cellular, satellite or IP phones, PCs, personal data assistants, video game consoles, IP devices, smart appliances, and so on). Within user devices 104a, 104b, network utilization systems 141a, 141b may, for example, include, fixed or mobally executable code for conducting the aforementioned interactions, other information utilization, or some combination thereof (e.g., one or more of browsers, call/conference applications, calendaring/productivity applications, network applications, and so on).

Figure 2:
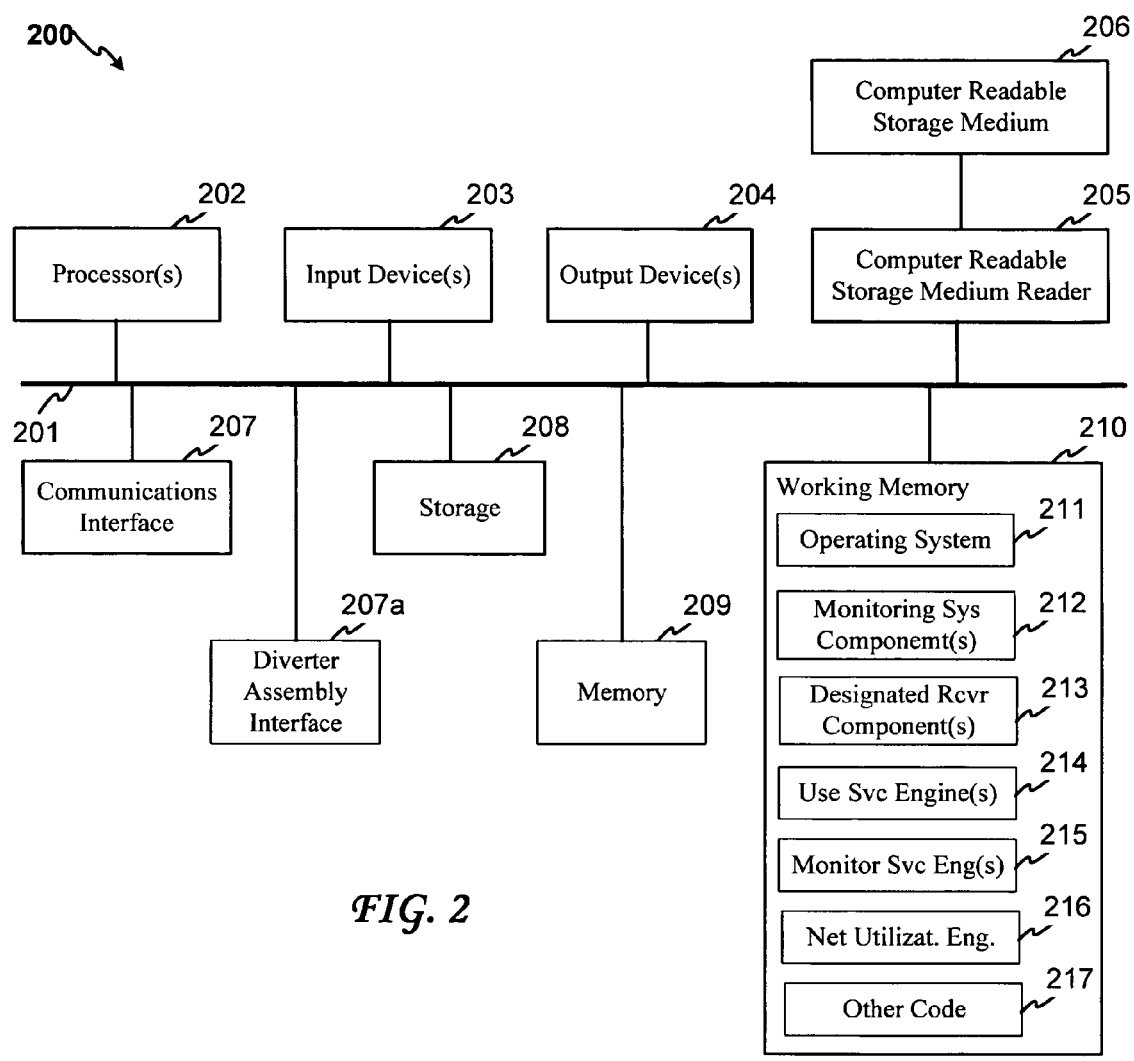
FIG. 2 is a schematic diagram illustrating an exemplary computing system including one or more of the monitoring enabled network system components of FIGS. 1a through 1c, according to an embodiment of the invention.

The FIG. 2 flow diagram illustrates a computing system embodiment that may comprise one or more of the components of FIGS. 1A through 1C. While other alternatives might be utilized or some combination, it will be presumed for clarity sake that components of systems 100a through 100c and elsewhere herein are implemented in hardware, software or some combination by one or more computing systems consistent therewith, unless otherwise indicated or the context clearly indicates otherwise.

Computing system 200 comprises components coupled via one or more communication channels (e.g. bus 301) including one or more general or special purpose processors 202, such as a Pentium®, Centrino®, Power PC®, digital signal processor ("DSP"), and so on. System 200 components also include one or more input devices 203 (such as a mouse, keyboard, microphone, pen, and so on), and one or more output devices 204, such as a suitable display, speakers, actuators, and so on, in accordance with a particular application.

System 200 also includes a computer readable storage media reader 205 coupled to a computer readable storage medium 206, such as a storage/memory device or hard or removable storage/memory media; such devices or media are further indicated separately as storage 208 and memory 209, which may include hard disk variants, floppy/compact disk variants, digital versatile disk ("DVD") variants, smart cards, partially or fully hardened removable media, read only memory, random access memory, cache memory, and so on, in accordance with the requirements of a particular implementation. One or more suitable communication interfaces 207 may also be included, such as a modem, DSL, infrared, RF or other suitable transceiver, and so on for providing inter-device communication directly or via one or more suitable private or public networks or other components that can include but are not limited to those already discussed.

A further diverter assembly interface 207a may also be included for providing particular diverter assembly type or configuration interfacing. Such interfacing may, for example, include but is not limited to conducting diverter assembly access, monitor authorization/ requesting party verification or other security, diverter enabling, disabling or other operation modifying, and so on. (It will be appreciated that a generalized or specific interface may be provided for these or other purposes in conjunction with one or more diverter assemblies, monitoring assemblies other components or some combination thereof.)

Working memory 210 further includes operating system ("OS") 211, and may include one or more of the remaining illustrated components in accordance with one or more of a particular device, examples provided herein for illustrative purposes, or the requirements of a particular application. Monitoring system components 212 may, for example, include monitoring assembly 132x, or further, a diverter system control, monitoring service engine 111 or designated recipient system component(s), in accordance with a particular monitoring system definition. More typically, however, a designated receiver and components thereof 213, use service engine(s) 214 monitor service engine(s) 215 and network utilization engine(s) 216 may be implemented in conjunction with a separately implemented designated receiver, service host and one or more user devices. Working memory of one or more devices may also include other program(s), which may similarly be stored or loaded therein during use.

The particular OS may vary in accordance with a particular device, features or other aspects in accordance with a particular application, e.g., using Windows, WindowsCE, Mac, Linux, Unix, a proprietary OS, and so on. Various programming languages or other tools may also be utilized, such as those compatible with C variants (e.g., C++, C#), the Java 2 Platform, Enterprise Edition ("J2EE") or other programming languages. Such working memory components may, for example, include one or more of applications, add-ons, applets, servlets, custom software and so on for conducting but not limited to the examples discussed elsewhere herein. Other programs 217 may, for example, include one or more of security, compression, synchronization, backup systems, groupware code, and so on, including but not limited to those discussed elsewhere herein.

When implemented in software, one or more of system 100a, 100b, 100c or other components may be communicated transitionally or more persistently from local or remote storage to memory (SRAM, cache memory, etc.) for execution, or another suitable mechanism may be utilized, and one or more component portions may be implemented in compiled or interpretive form. Input, intermediate or resulting data or functional elements may further reside more transitionally or more persistently in a storage media, cache or other volatile or non-volatile memory, (e.g., storage device 208 or memory 209) in accordance with the requirements of a particular application.

The FIGS. 3A through 3F flow diagrams illustrate examples of diverter assemblies 131x of FIGS. 1A through 1C in greater detail, according to embodiments of the invention.

Figure 3A:
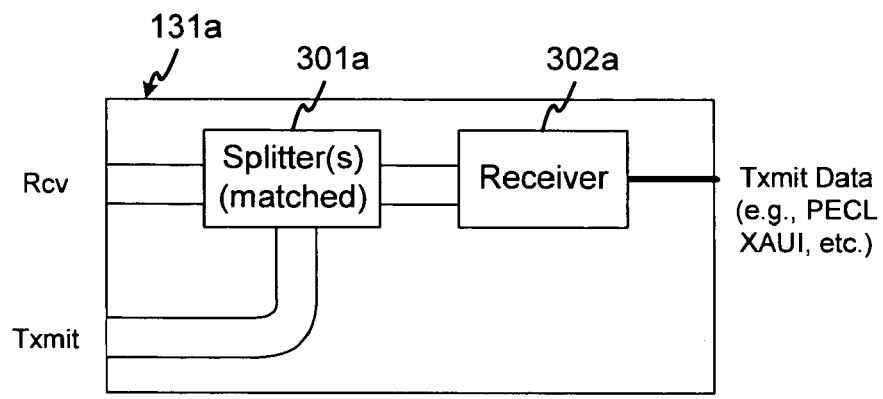
FIG. 3a is a flow diagram illustrating, in greater detail, an example of a diverter assembly of FIGS. 1a and 1b, according to an embodiment of the invention.

Beginning with FIG. 3A, diverter assembly 131a includes an optic splitter 301a and receiver 302a configuration whereby an optical transmission (content) signal is received by splitter 301a. Splitter 301a splits received content (e.g., according to a predetermined level of a predetermined wavelength portion) and transfers a diverted content portion to receiver 302a. Receiver 302a receives and converts the diverted content to an electrical signal that receiver 302a further transfers to monitoring assembly (not shown) using positive emitter coupled logic (PECL), ten gigabit attachment unit interface (XAUI), and so on, as may be suitable to a particular monitoring assembly or other receiving device. Splitter 301a or receiver 302a may also provide for conducting wavelength division de-multiplexing, for example, for transferring content corresponding to one or more particular wavelength portions. Splitter 301a also transfers at least a second optical signal output that is routed to a diverter output (e.g., SC or LC connector) as a non-diverted output. Where, for example, diverter assembly 131a is disposed within a network branch, one portion of the branch may be coupled to a receiver input for receiving content, while another portion of the same branch is coupled to a diverter output for receiving non-diverted content that may then continue along its non-diverted path.

In a more specific embodiment, splitter 301a is generally matched with receiver 302a (or visa versa), thereby enabling a diversion of only a low level portion of the diverted content. The receiver may, for example, include a "better than standard" or typically utilized receiver. It is expected, for example, that by utilizing a 'better than standard' receiver, diverting about 20 percent of the received optical signal is sufficient, thus enabling a non-diverted signal level of about 80 percent. Other signal levels may also be suitable in accordance with the use of low loss connectors or other components, greater or lesser monitoring system integration (e.g., see FIGS. 5 and 6) or otherwise according to the requirements of a particular application. Diverter assembly 131a may also include control components or a control I/O (not shown) for enabling, disabling or otherwise modifying a current receiver component state; however, care should be exercised to minimize component unavailability, thereby avoiding detectability, hindering content transmission or other problems that may arise.

Figure 3B:
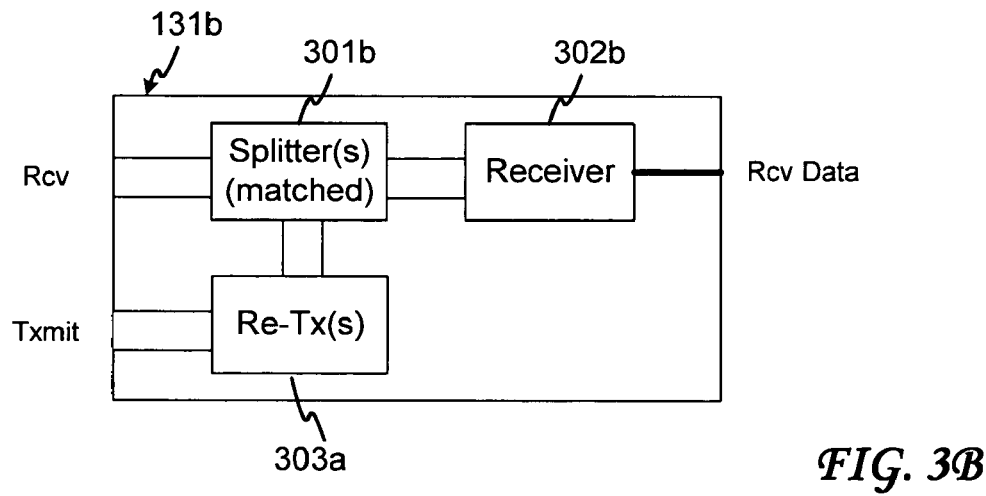
FIG. 3b is a flow diagram illustrating, in greater detail, another example of a diverter assembly of FIGS. 1a and 1b, according to an embodiment of the invention.

The FIG. 3B diverter assembly embodiment 131b differs from that of FIG. 3A through its inclusion of at least one re-transmitter 303a, as well as the exemplary configuration utilizing re-transmitter 303a. In this embodiment, re-transmitter 303a is coupled to the non-diverted output of splitter 301b, such that re-transmitter 303a may receive non-diverted content, modify the level of the non-diverted content and output the modified non-diverted content. Re-transmitter 301a may, for example, increase the non-diverted signal level to about 100 percent of that received by diverter assembly 131b, thereby avoiding detection of content diverting (e.g., in conjunction with legal intercept type monitoring) or otherwise in accordance with the requirements of a particular application. Any suitable re-transmitter, receiver-transmitter, booster or other component(s) may be used, which may or may not convert the optical splitter 301b output to/from an electrical signal. Diverter assembly 131b may also include control components or a control I/O (not shown) for enabling, disabling or otherwise modifying a state of a re-transmitter, other component(s) or some combination; however, care should be exercised to minimize component unavailability, thereby avoiding detectability, hindering content transmission or other problems that may arise.

Figure 3C:
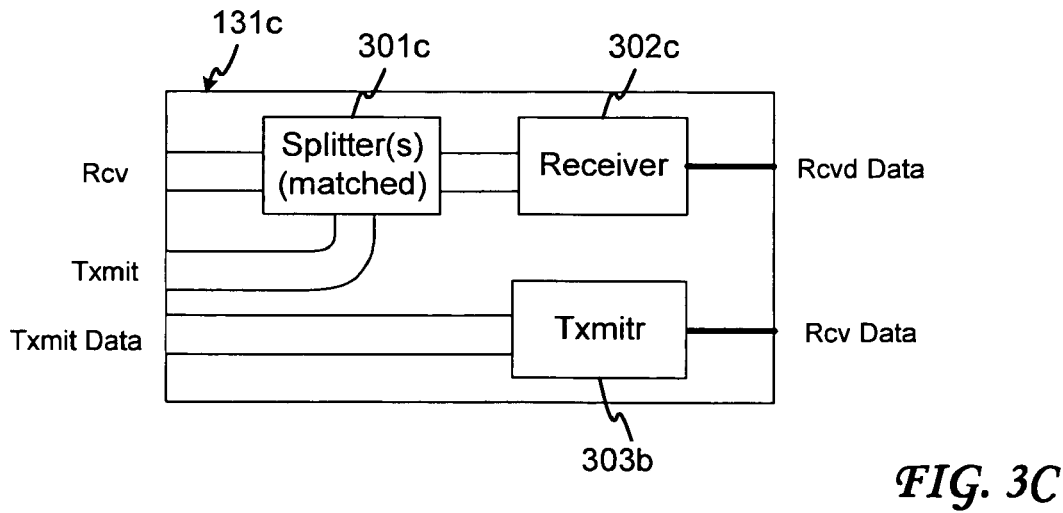
FIG. 3c is a flow diagram illustrating, in greater detail, a further example of a diverter assembly of FIGS. 1a and 1b, according to an embodiment of the invention.

The FIG. 3C diverter assembly embodiment 131c differs from that of FIG. 3A through its inclusion of at least one transmitter 303b, as well as the exemplary configuration utilizing transmitter 303b. In this embodiment, transmitter 303b is coupled to a further electrical input of assembly 131c, such that transmitter 303a may receive external input (e.g., from a monitoring assembly), convert the electrical input to an optical output signal and output the optical output signal. Alternatively, a multiplexer may be used to optically (or via conversion, electrically) combine the input signal with the non-diverted content signal (not shown). The FIG. 3D1 and 3D2 diverter assembly embodiments 131d1 131d2 illustrate how diverted output may also be provided as optical, electrical (e.g., using a re-transmitter, receiver, multiple/multiple-port splitter(s), and so on) or both, in accordance with the requirements of a particular application.

Figure 3E:
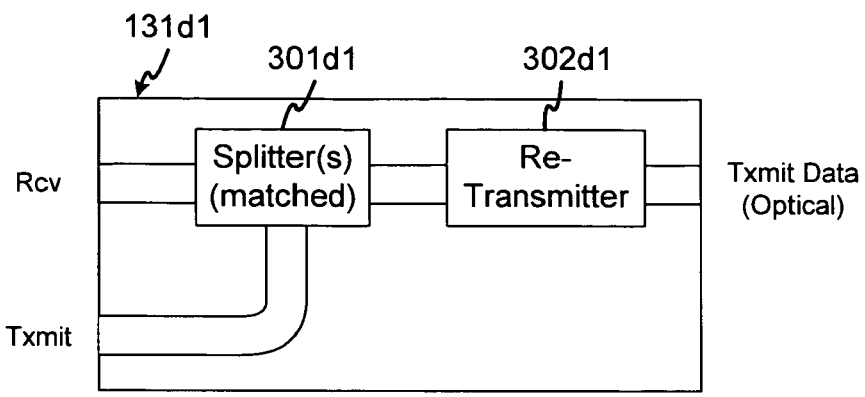
FIG. 3e is a flow diagram illustrating, in greater detail, yet another example of a diverter assembly of FIGS. 1a and 1b, according to an embodiment of the invention.
Figure 3E:
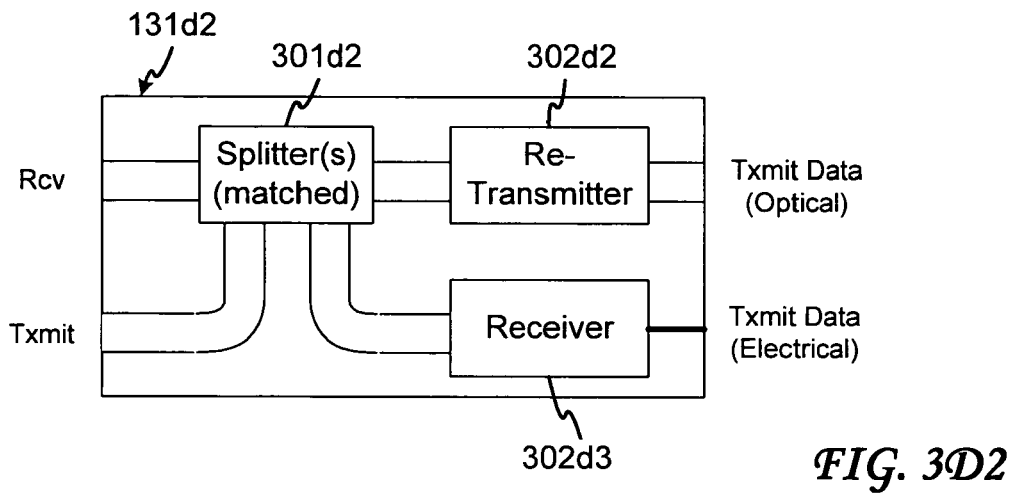
Figure 3E:
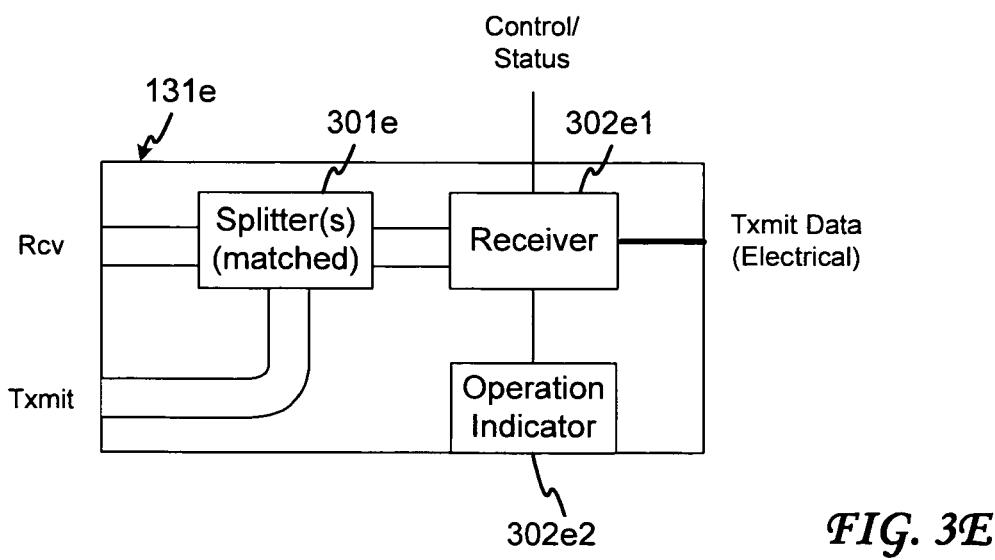
Figure 3F:
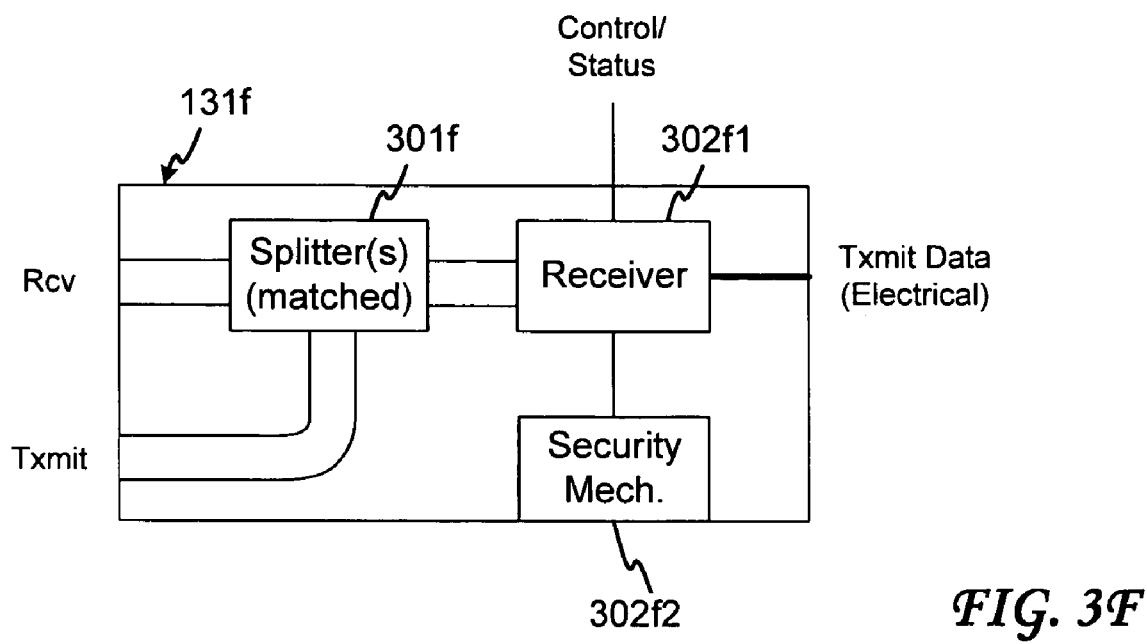
FIG. 3f is a flow diagram illustrating, in greater detail, a still further example of a diverter assembly of FIGS. 1a and 1b, according to an embodiment of the invention.

FIGS. 3E and 3F further illustrate embodiments including examples of usability features that may be employed. Diverter assembly 131e of FIG. 3E, for example, includes an operation indicator 302e2 coupled, in this example, to receiver 302e1. Indicator 302e2 may, for example, include an output device and output device driver (e.g., see FIG. 2) for displaying, sounding or otherwise presenting one or more indications of diverter assembly 131e status, state or operation (hereinafter, operation). Such indication(s) may include but are not limited to receiver/re-transmitter on/off, setting, and so on, receipt of an optical signal or (re-)transmission thereof or to a monitoring system, authorized/unauthorized diverter assembly/monitoring system access, information status (e.g., designated, not designated, data, code, header, and so on) or other processing, which may further utilize an included content analyzer or utilize an analyzer of a coupled monitoring assembly or other device, or some combination thereof. Diverter 131e may also include a signal analyzer (not shown), which may further provide for analyzing signal power, spectral details, data jitter or other signal attributes. (It will be appreciated that an operation indicator may be included separately or in an integrated manner with a diverter assembly, monitoring assembly, and so on, or some combination thereof.)

Diverter assembly 131f of FIG. 3F, which may correspond to the above or other diverter assembly embodiments, includes security 302f2. Security 302f2 may, for example, provide for conducting one or more of cryptographic, password and other security mechanisms. Such mechanism(s) may, for example, provide for enabling receiver, diverting, diverting destination or other diverter (and/or monitoring) assembly operation by a suitably authorized person or device. In one embodiment, a security mechanism provides for receiving and verifying a code (e.g., provided to the person/device under seal, via transfer with cryptography, and so on, or some combination) before enabling access, state/operation verification or other attempted operation by such person or device. The above, other security mechanisms or some combination may, for example, be conducted in an otherwise conventional manner for conducting secure transactions or other more conventional computing operations. (As noted earlier, a direct, network or other coupling or one or more operation indicators may also be used.)

It will be appreciated that component replication or other diverting system modifications may also be utilized in accordance with the requirements of a particular application. It will become apparent, however, that the ability of the FIG. 3A through FIG. 3F diverter system configurations enable packaging of a diverter within a conventional or compatible packaging assembly may offer certain standardization or integration advantages (e.g., see below).

Figure 4A:
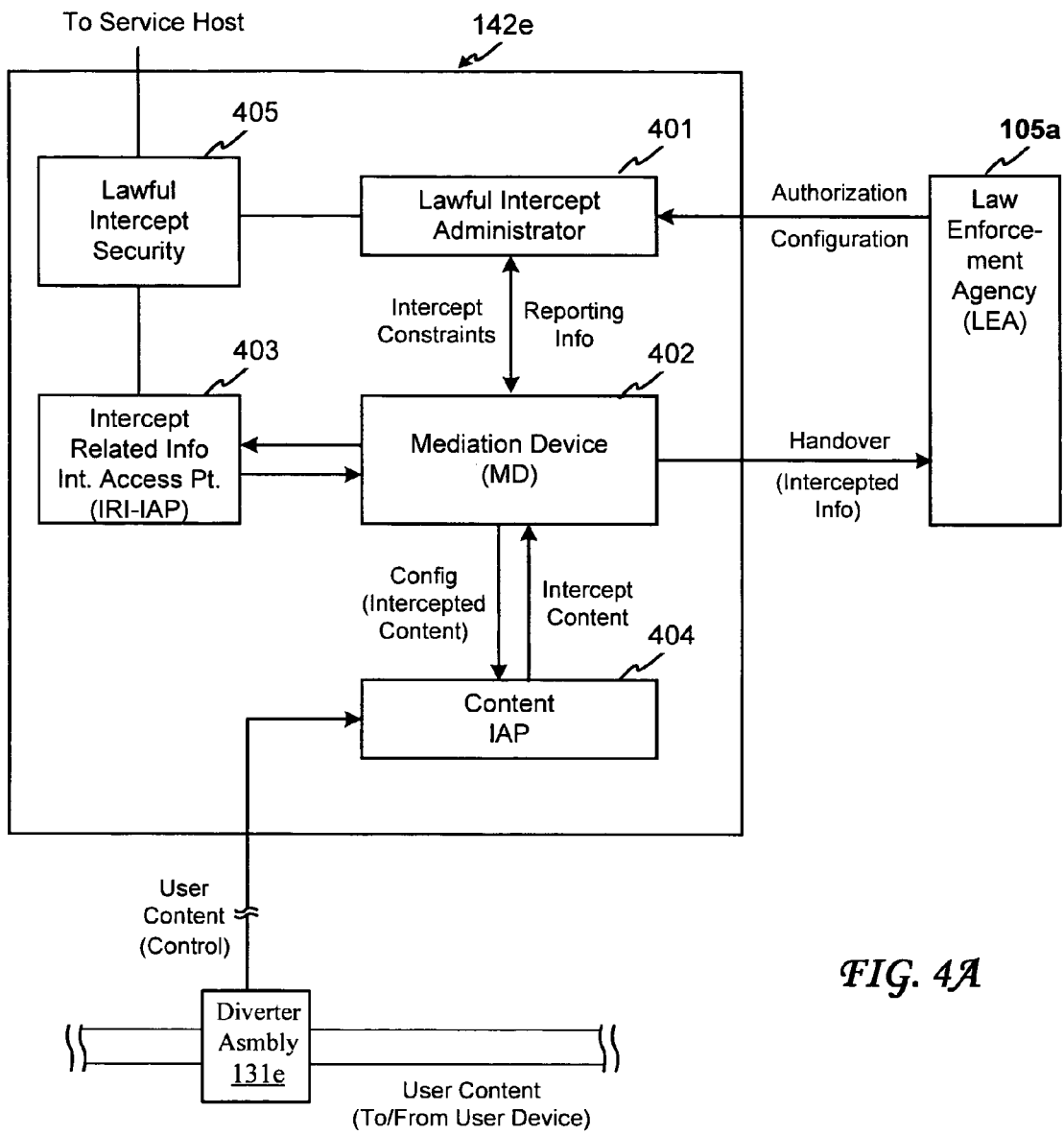
FIG. 4a is a flow diagram illustrating a monitoring assembly useable in conjunction with conducting legal intercepting, according to an embodiment of the invention.
Figure 4B:
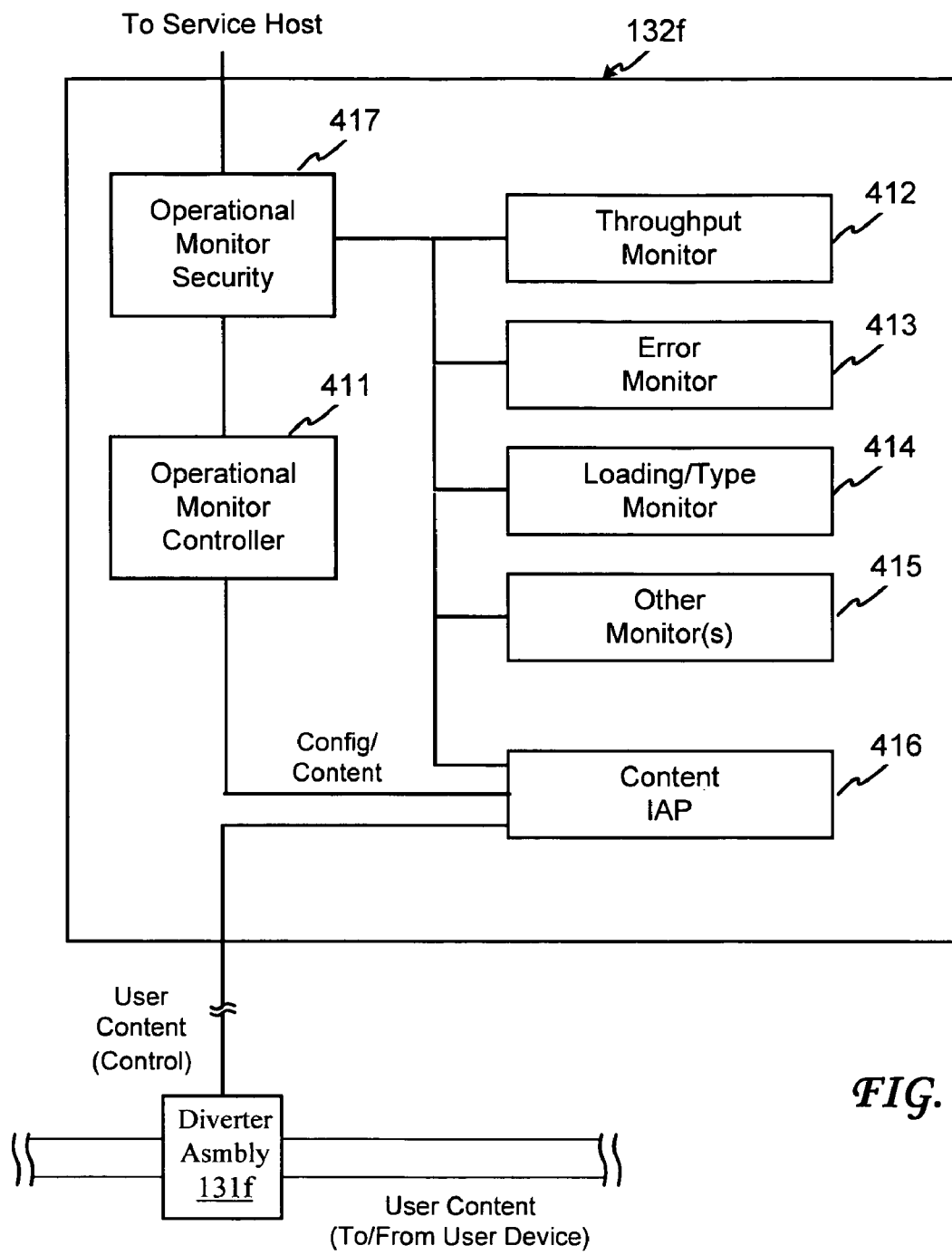
FIG. 4b is a flow diagram illustrating a monitoring assembly useable in conjunction with conducting operational monitoring, according to an embodiment of the invention.

The FIGS. 4A and 4B flow diagrams illustrate examples of monitoring system 103x of FIGS. 1a through 1c in greater detail, according to embodiments of the invention. FIG. 4A more specifically illustrates an example of how a monitoring system may include a monitoring assembly configured for legal intercept type monitoring, while the monitoring system example of FIG. 4B is configured for operational type monitoring.

As shown in FIG. 4A, monitoring assembly 142e includes lawful intercept administrator (administrator) 401, mediation device 402, intercept related information intercept access point (IRI-IAP or RIAP) 403, content intercept access point (CIAP) 404 and lawful intercept security engine (security engine) 405. Administrator 401 provides for conducting verification and assignment of a designated receiver, monitoring assembly configuration or other administrative operations that may be utilized in accordance with the requirements of a particular application.

Administrator 401 may, for example, receive a request for lawful intercept type monitoring from a law enforcement agency (LEA) or other monitoring requester 105a. (In other embodiments, one or more requesters may be the same or differ from one or more designated receivers.) A request may, for example, be made pursuant to an LEA securing a suitable warrant. Administrator 401 responds to a monitoring request by verifying, with the LEA or a court or other trusted third party, the allowability of the warrant and the extent or other monitoring criteria of the monitoring that may be conducted. (A monitoring criteria portion may more generally be determined as or from standardized or otherwise predetermined criteria or received/derived criteria. Monitoring criteria may, for example, indicate that monitoring is to be extended or limited to one or more of particular users, devices, uses, times, applications, start/end delimiters, locations, parameters for determining specific criteria, extension/diminution information, or other monitoring criteria. Monitoring criteria may also indicate the manner or limitations according to which communication with a service host or other external device may be conducted.)

Administrator 401 may further request (or an initial or other request may include) monitoring criteria indicating that processing is to be conducted, intercept related information is to be provided and associated with content or utilized for processing, or other further monitoring criteria, particularly since local, national or international jurisdictional requirements or other criteria may vary. Yet other criteria may also be standardized, known or otherwise predetermined. Administrator 401 responds to such further monitoring criteria or predetermined such criteria by transferring corresponding criteria to mediation device 402 for configuring CIAP 404 to correspondingly enable diverter assembly 131c operation or to maintain for processing or transfer to LEA 105a only content that is specifically authorized or verified. Administrator 401 may similarly transfer corresponding criteria to mediation device 404 for configuring RIAP 403 to secure for processing or transfer to LEA 105a only content related information that is specifically authorized or verified, or further information that is necessary or otherwise may be used to comply with the warrant (e.g., encryption keys or other content/non-content translation information). Administrator 401 may also configure mediation device 402 for providing information to the designated receiver at the appropriate time and manner (e.g., piecemeal or bulk storage/transfer, timing, security, format, and so on) or configure security 405 in a manner corresponding to the request (e.g., varying host identification, secure access or other criteria corresponding to a particular technically astute subject, matters of local/wider interest, investigation, national security, and so on).

Mediation device 402 provides for configuring CIAP 404 and RIAP 405, and for collecting diverted content or non-content information respectively from CIAP 404 and RIAP 403 responsive to criteria, configuration or other information received from administrator 401. As was noted earlier, due to user/monitoring security, expediency or other considerations, only targeted information may undergo monitoring processing modification or transfer by monitoring system. Mediation device 402 therefore configures CIAP 404 and RIAP 405 to either exclude all information as may be appropriate (e.g., at times during which legal intercept type monitoring or operational monitoring is not to be conducted) or to determine the applicability of intercepted content or a requisite for non-content information.

Mediation device 402 also provides for conducting processing of such information if monitoring processing is to be conducted, storing such information if it is to be stored, transferring such information or processed information to a designated receiver, initiating corresponding alerts or requests, and so on. As noted, a secure protocol for conducting such operation may be determined in accordance with a request, predetermined criteria or both in accordance with the requirements of a particular application.

CIAP 404 provides for configuring and controlling diverter assembly operation where such configuring or controlling is to be conducted. For example, CIAP 404 may respond to monitoring criteria received from mediation device 402 by disabling diverter assembly 131e operation at times other than when monitoring is to be conducted, e.g., by disabling a diverting assembly receiver, or otherwise modifying diverter assembly operation. (Alternatively or in conjunction therewith, diverter assembly components may be provided to conduct such operation more directly.) CIAP 404 also provides for receiving content information from diverter assembly 131c, and verifying or forwarding to mediation device 402. As noted, such verification may, for example, include comparing diverted content with criteria, configuration or other information provided by mediation device 402 (e.g., by comparing packet header information in conjunction with a packet switching network), and storing/ forwarding or disregarding designated or non-designated content respectively. CIAP 404 may further respond to mediation device 402 by requesting from RIAP 403 (via mediation device 402) non-content information as need to identify or associate content. RIAP 403 similarly responds to media device 402 by requesting, from a service host or other device (via security 405) non-content information or transferring such information to mediation device 402.

Security 405 provides for implementing security operation in conjunction with requests or transfers respecting a service host or other external device. Security operation may, for example, include determining whether a request for information is to be processed or ignored, the manner of processing the request if it is to be processed and the manner of communicating with the external device if such communication is to be conducted. Security 405 also provides for determining the manner in which a request for non-content information is to be requested, verified (if received) or transferred to other monitoring assembly components. It will be appreciated that various security mechanisms may be employed, may of which may be used for other purposes, in accordance with the requirements of a particular application.

Law enforcement agency 105a is illustrative of a monitoring requestor or designated receiver that may be utilized in conjunction with legal intercept, operational or other monitoring. In the present example, LEA 105a provides for requesting monitoring, supplying monitoring criteria, conducting verification of a monitoring request and receiving processed or unprocessed content or non-content information from monitoring assembly 142e, for example, as was already discussed. While monitoring may be conducted in a more distributed form in which information may be intercepted by different monitoring assemblies and collected, associated or otherwise processed and transferred by monitoring assembly 142e, security concerns may require otherwise. In the present embodiment, for example, multiple user interaction monitoring may be conducted by different monitoring assemblies, which may conduct processing and transfer to LEA 105a. However, the present embodiment provides for LEA to conduct further associating, which associating may be facilitated through the use of a common request identifier provided to two or more monitoring assemblies and returned by the assemblies to LEA 105a in conjunction with content/non-content information (e.g., see above).

Turning now to FIG. 4B, the illustrated operational monitoring assembly embodiment includes operational monitor controller (controller) 411, as well as one or more operational monitors. In the present example, such monitors (or monitor engines) may include a throughput monitor 412, error monitor 413, loading/type monitor 414 and other monitors 415. Operational monitoring assembly 132f further includes content IAP 416 and operational monitor security (security) 417. (An RIAP, which is not shown for clarity sake, may also be utilized in a similar manner as with RAIP 403 of FIG. 4A.) Within monitoring assembly 132f, controller 411 is operable in a similar manner as with administrator 401 and mediation device 402 of FIG. 4A. For example, controller 411 may respond to a monitoring request (or initiation) by configuring or providing monitoring criteria to monitors and CIAP 416. Controller 411 may also utilize predetermined, standardized or other criteria, for example, as was discussed with reference to FIG. 4A.

Throughput monitor 412 responds by receiving from CIAP 416 content information and determining therefrom generalized throughput (e.g., of a branch or device) or designated throughput corresponding to a particular user, location, subject, interaction, time period, use, application, media, and so on. Error monitor 413 responds to content information received from CIAP 416 by tracking or further analyzing or providing recovery information corresponding to generalized or designated error conditions. Loading/type monitor 414 responds to content information received from CIAP 416 by tracking or further analyzing generalized or designated loading conditions. Loading/type monitor 414 may further determine type information corresponding to a particular type of condition/criteria according to which loading may correspond. Other monitors 415 may also respond similarly, or otherwise in accordance with the requirements of a particular application, by providing corresponding monitoring information. (It will be appreciated that legal intercept monitoring may also be conducted in conjunction with operational monitoring by one or more monitoring assemblies that may be coupled to one or more diverter assemblies.)

Content IAP (CIAP) 416 and security 417 are operable in a similar manner as with CIAP 404 and security 405 of FIG. 4A respectively. CIAP 416 may, for example, respond to controller 411 configuration information by receiving content from diverter assembly 131f and verifying or (conditionally) transferring the content to one or more of monitors 412 through 415. CIAP 416 may also temporarily or more permanently store generalized or designated content for use by one or more of monitors 412 through 415 in a suitable computer readable storage media (e.g., see FIG. 2), which is not shown for clarity sake. Security 417 may, for example, provide for limiting access to monitoring assembly 132*f* components or content, verifying an access attempt, or configuring/securing content, monitoring criteria or other information as needed.

Figure 5:
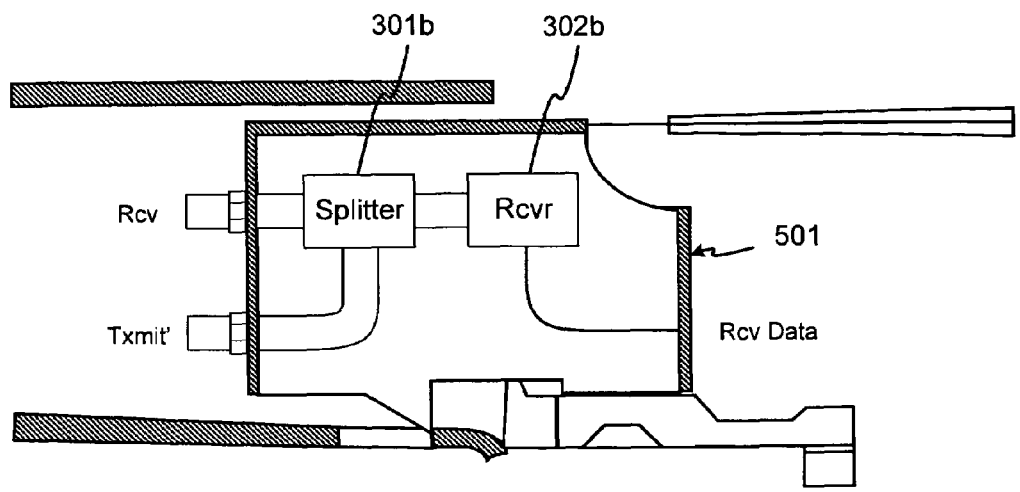
FIG. 5 is schematic diagram illustrating a diverter assembly according to an embodiment of the invention.
Figure 6:
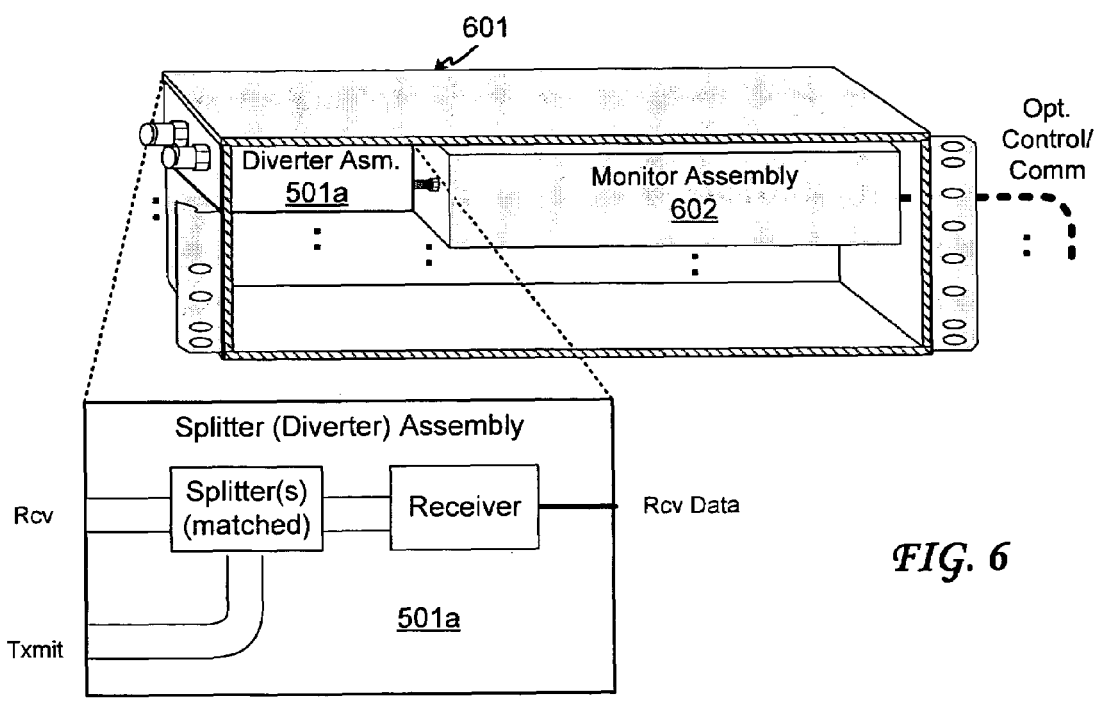
FIG. 6 is a partial cutaway view illustrating an example of matching/integrating a diverter assembly with a monitoring assembly according to an embodiment of the invention.

FIGS. 5 and 6 illustrate examples of how a diverting assembly may be configured for integration with a monitoring assembly, or may further be integrated in a fixed or removable manner with a monitoring assembly, according to an embodiment of the invention. As shown in FIG. 5, a diverting assembly may be configured in accordance with the above, other or combined examples such that the diverting assembly may be packaged within a conventional optical transmission module 501 or a module that is compatible with a conventional module (e.g., by arranging electrical or optical connectors in a suitable manner for such integration. Suitable conventional modules may, for example, include but are not limited to those conforming to SFF-8053 Specification for GBIC (Gigabit Interface Converter Rev 5.5, Sep. 27, 2000), "Cooperation Agreement for Small Form-Factor Pulggable Transceivers", XENPAK, "A cooperation agreement for 10 Gigabit Ethernet Transceiver Package", X2, "A Cooperation Agreement for a Small Versatile 10 Gigabit Transceiver Package", INF-8077i-10 Gigabit Small Form Factor Pluggable Module—Revision 4.0, Apr. 13, 2004 or various available or proposed devices espoused by the member or ratifying or other companies.

As shown in FIG. 6, for example, a diverter assembly 501*a* so configured may be readily disposed within a monitoring assembly module 601 that may otherwise be used for legal intercept, operational or other monitoring. Alternatively, one or more diverter assemblies or monitoring assemblies may be disposed within a standardized or compatible rack mount (as illustrated) or other optical assembly module. Various rack mountable optical device assemblies are, for example, currently patented or patent pending. (Note, however, that the particular diverter and monitoring assembly component configurations of FIGS. 5 and 6 are shown by way of example only and should not be construed as limiting.)

Figure 7A:
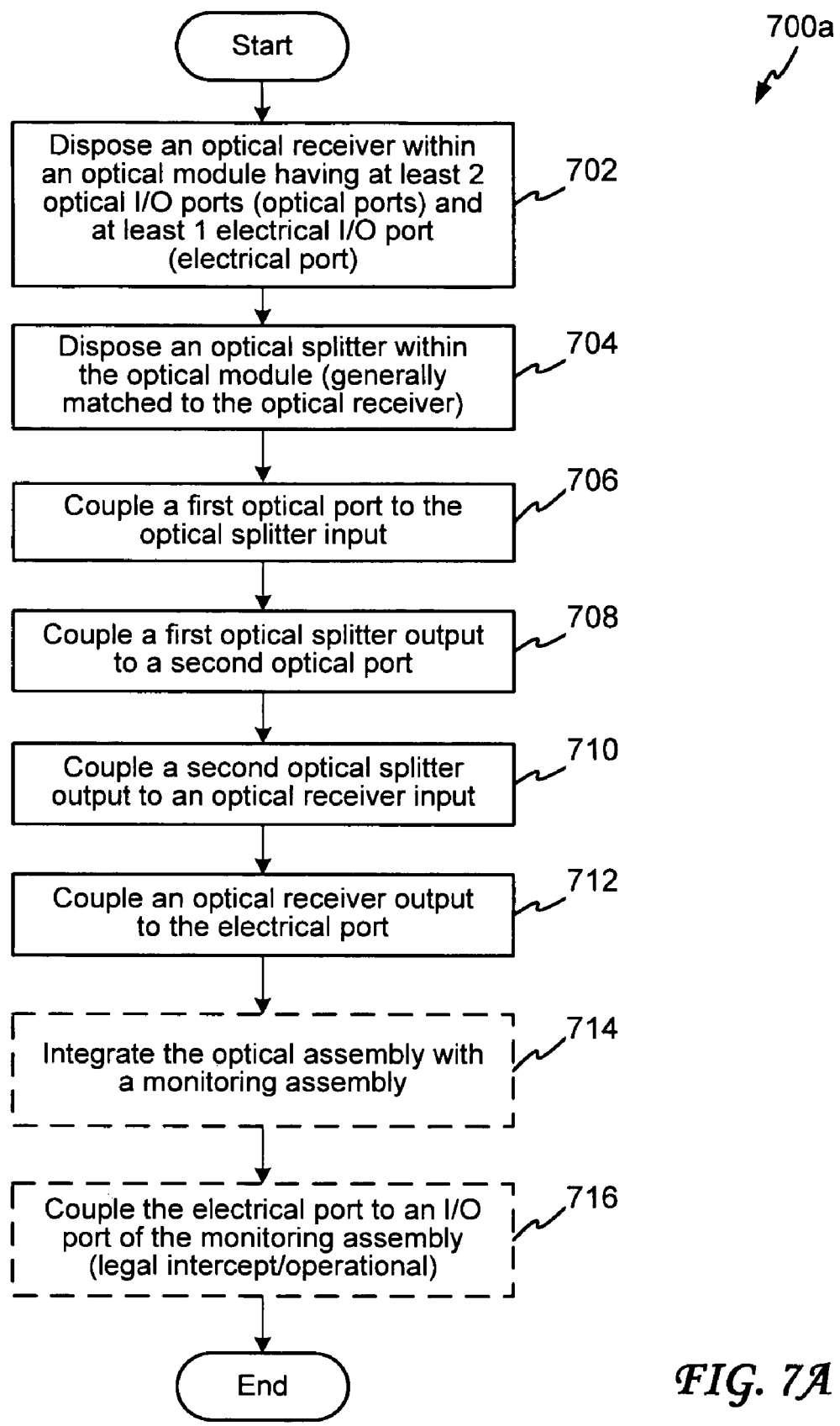
FIG. 7a is a flowchart illustrating a method for configuring a diverter assembly according to an embodiment of the invention.
Figure 7B:
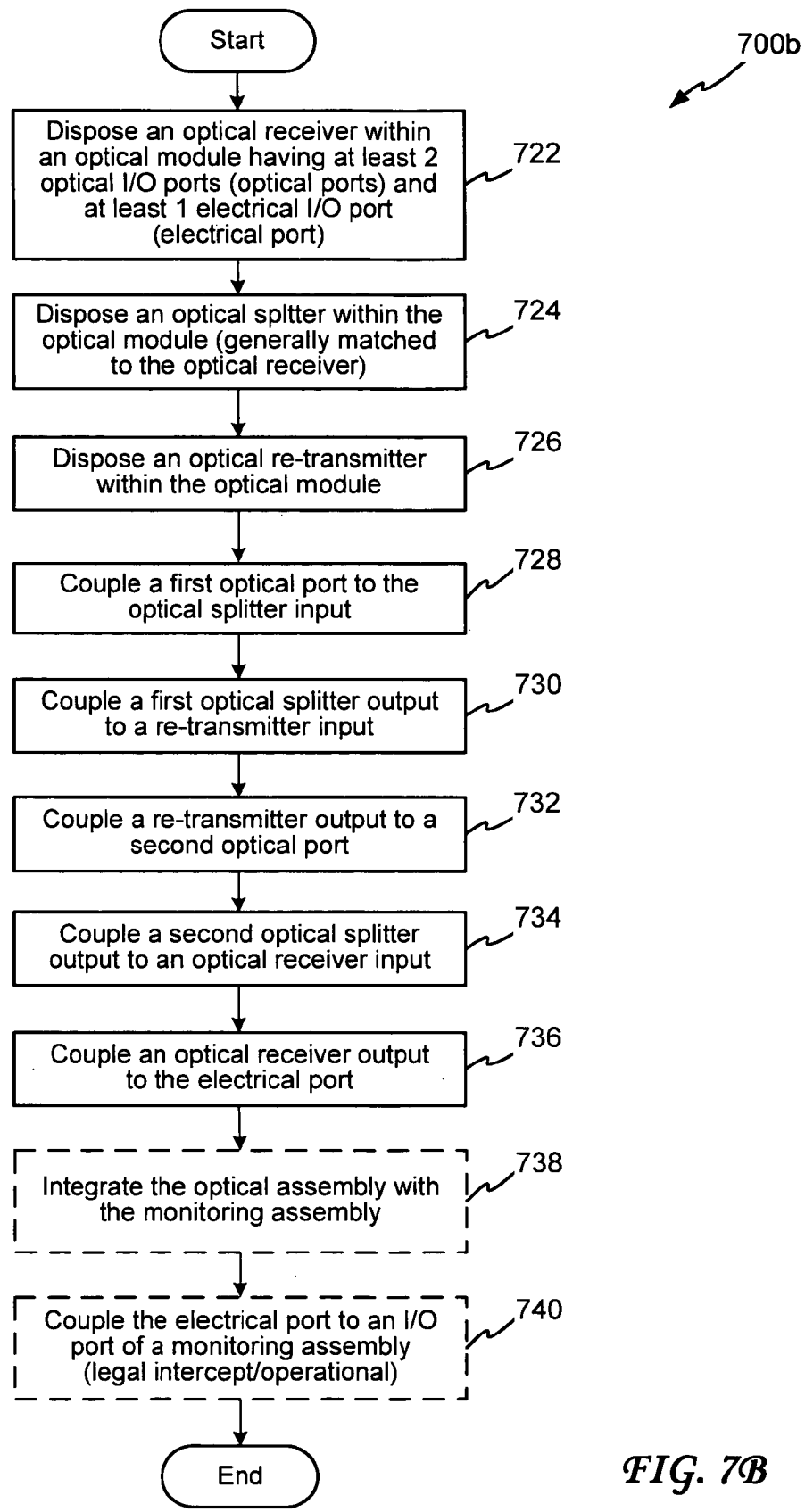
FIG. 7b is a flowchart illustrating another method for configuring a diverter assembly according to an embodiment of the invention.

The FIGS. 7A through 7B flowcharts illustrate methods 700*a* and 700*b* for forming an optical diverter assembly according to embodiments of the invention. Beginning with FIG. 7A, an optical receiver and optical splitter are disposed within an optical assembly module having at least two optical ports and one electrical port in blocks 702 and 704. As was discussed earlier, the optical assembly module may, for example, include a standardized optical module (e.g., an optical receiver type module) or a module that is compatible with a standardized module (e.g., providing for a fewer or greater number of ports). In block 706, a first optical port is coupled to the optical splitter input. In blocks 708 and 710 respectively, a first optical splitter output is coupled to a second optical port and a second optical splitter output is coupled to an optical receiver input. In block 712, an optical receiver output is coupled to the at least one electrical port. In blocks 714 and 716 respectively, the optical assembly may be integrated with a monitoring assembly and may also be coupled to the monitoring assembly by coupling the electrical port of the optical assembly to a monitoring assembly port. The monitoring assembly may, for example, perform one or more of legal intercept type monitoring, operational monitoring and other monitoring. As was noted earlier, the same or another electrical coupling may be used to communicate diverted information from the optical diverter assembly to the monitoring system or for controlling the optical assembly.

Continuing with FIG. 7B, an optical diverter assembly may also be formed that further includes at least one optical re-transmitter, transmitter or other component(s). As shown in FIG. 7B, for example, an optical receiver, optical splitter and optical re-transmitter are disposed within an optical assembly module having at least two optical ports and one electrical port in blocks 722 through 726. The optical assembly module may, for example, include a standardized optical module (e.g., an optical receiver type module) or a module that is compatible with a standardized module as with method 700*a*. In block 728, a first optical port is coupled to the optical splitter input. In blocks 730 and 732 respectively, a first optical splitter output is coupled to an optical re-transmitter input the re-transmitter output is coupled to a second optical port. In block 734, a second optical splitter output is coupled to an optical receiver input, and in block 736, an optical receiver output is coupled to an electrical port. In blocks 738 and 746, respectively, the optical assembly may be integrated with a monitoring assembly and may also be coupled to the monitoring assembly by coupling the electrical port of the optical assembly to a monitoring assembly port.

The monitoring assembly may, for example, be configured for performing one or more of legal intercept type monitoring, operational monitoring and other monitoring. Integration may, for example, include generally matching the electrical port of the optical assembly to a monitoring assembly input for communicating information from the optical signal applied to the optical diverter assembly to the monitoring system, or for controlling the optical diverter assembly via the monitoring assembly. Controlling may, for example, include the monitoring assembly enabling or disabling the optical diverter assembly receiver, or other component(s), for modifying an optical diverter frequency, level or other diverter assembly state parameter(s), and so on, in accordance with the requirements of a particular application.

Figure 8A:
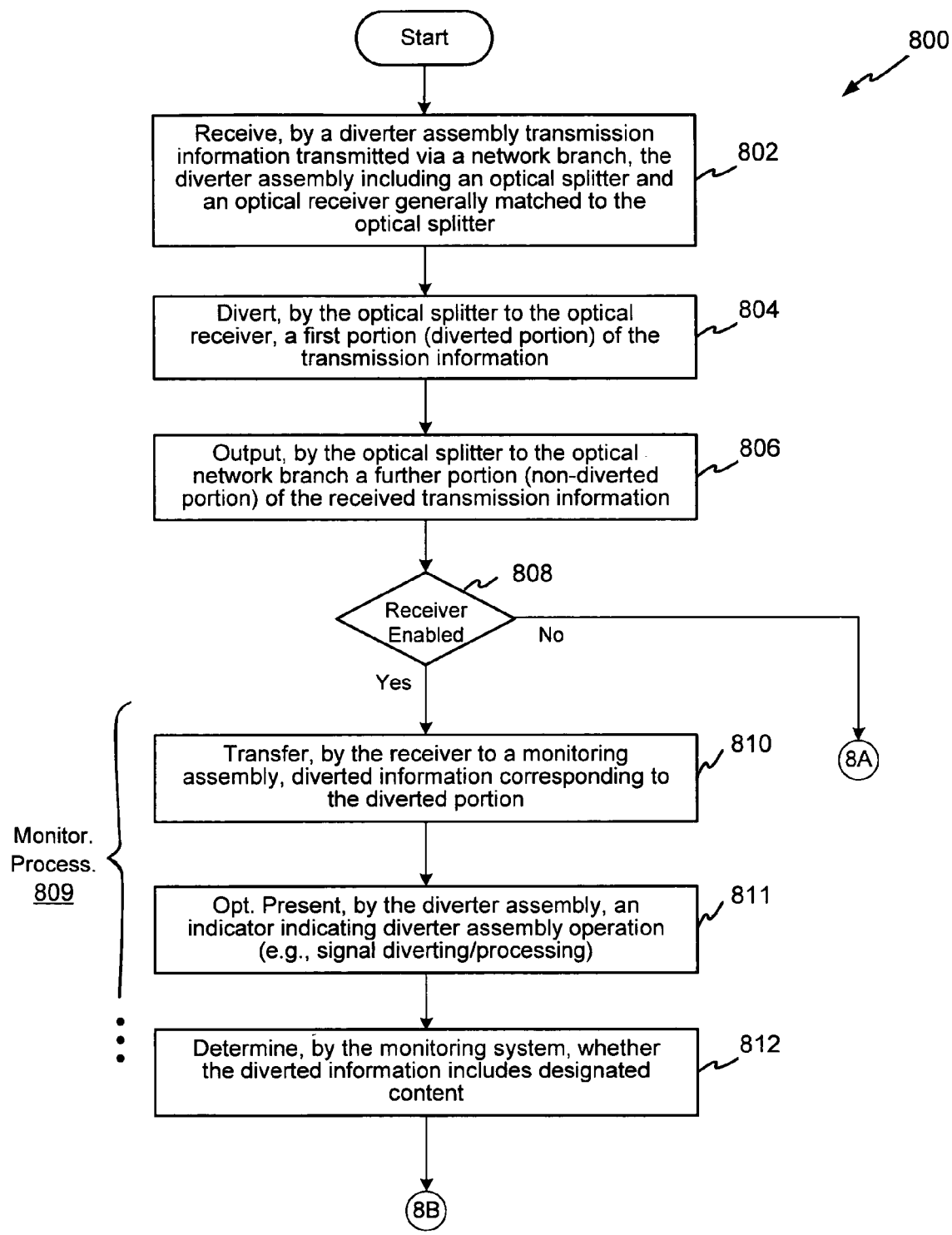
FIG. 8a is a flowchart illustrating a method for conducting diverting or further conducting monitoring, according to an embodiment of the invention.
Figure 8B:
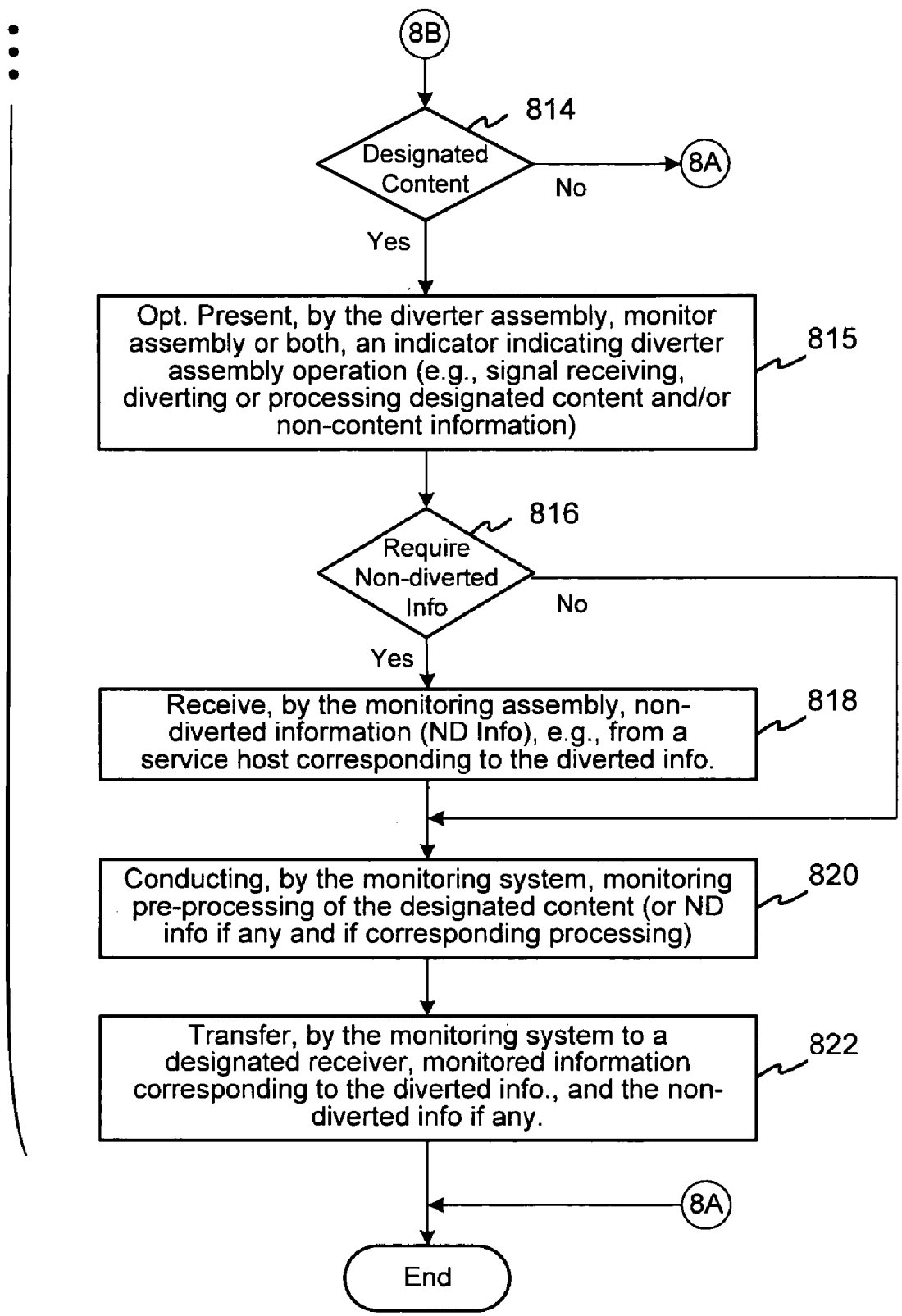

Turning now to FIGS. 8A and 8B, a method 800*a* and 800*b* is illustrated for conducting monitoring of an optical transmission (using a diverter assembly) according to an embodiment of the invention. In this embodiment, the optical transmission includes an optical transmission via a network branch.

Beginning with FIG. 8A, a diverter assembly including an optical receiver and an optical splitter receives optical transmission information in block 802. The optical splitter is more preferably generally matched to the optical receiver which may, for example, receive up to 20 percent or more (typically about 20 percent) of at least one optical transmission frequency. In block 804, the optical splitter diverts, via a first optical splitter output, a first portion (diverted portion) of the optical transmission to the optical receiver. In block 806 the optical splitter outputs, via a second optical splitter output, a further portion (non-diverted portion) of the received information transmission back to the optical network branch (typically about 80 percent). The optical splitter may alternatively output the non-diverted portion to a re-transmitter, which may raise the signal level of the non-diverted information, otherwise process the non-diverted information or some combination thereof, or re-transmission may be conducted via a transmitter coupled to a receiver output. If, in block 808, the receiver is enabled, then monitoring processing may be conducted in block 809, which processing may, for example, include a portion of blocks 810 through 822. (The operation of the optical receiver or other diverter components may, for example, be enabled, disabled or otherwise controlled by a monitoring assembly coupled to the diverter assembly or some other external or extra-diverter system component.) If instead the receiver is disabled in block 608, then the method ends (see connector 8A of FIG. 8B).

In block 810, the optical receiver transfers, to a monitoring assembly, diverted information corresponding to the diverted portion. (The monitoring assembly preferably receives the diverted portion, which portion has been diverted as already discussed, and performs monitoring processing. Note however that monitoring processing may more generally be conducted by one or more of suitably configured diverter assemblies, monitoring assemblies or some combination.) In block 811, the diverter assembly presents an indicator indicating diverter assembly operation (e.g., see, for example, FIG. 3E above).

In block 812, the monitoring system determines whether the diverted information includes designated content. Designated content may, for example, include content criteria for designating particular transmission information to monitor in conjunction with legal intercept, operational or other monitoring, for example, as was already discussed. Other transmission information may be discarded, ignored or otherwise treated as null information. Monitoring processing may then continue with block 814 of FIG. 8B. (It should be noted that the designated content may include any or all of the diverted information, and is not limited to a data/code block, header, meta data or other subset of received transmission information or corresponding information.)

If, in block 814, the diverted information includes designated content, then the method continues with block 816; otherwise the method ends. In block 811, the diverter assembly, monitoring assembly or both may present an indicator indicating diverter assembly operation (e.g., see, for example, FIG. 3E above).

In block 816, the monitoring system determines whether non-diverted information is also used in the monitoring process. If so, then the monitoring assembly receives non-diverted information, for example, from a service host (or other external system component) in block 818. Non-diverted information may, for example, include non-diverted content or other information as was already discussed. In block 820, the monitoring assembly conducts monitoring pre-processing of the designated content, for example, as was already discussed. The monitoring assembly may also associate the non-diverted information, use the non-diverted information to process the designated content or otherwise process the non-diverted information. In block 822, the monitoring system transfers the designated content, non-diverted information if any, processed information, if any, or other monitored information to at least one designated receiver. A designated receiver may, for example, include but is not limited to one or more of law enforcement agencies (e.g., for legal intercept type monitoring), service hosts or other system devices (e.g., for operational monitoring), and so on.

Figure 9:
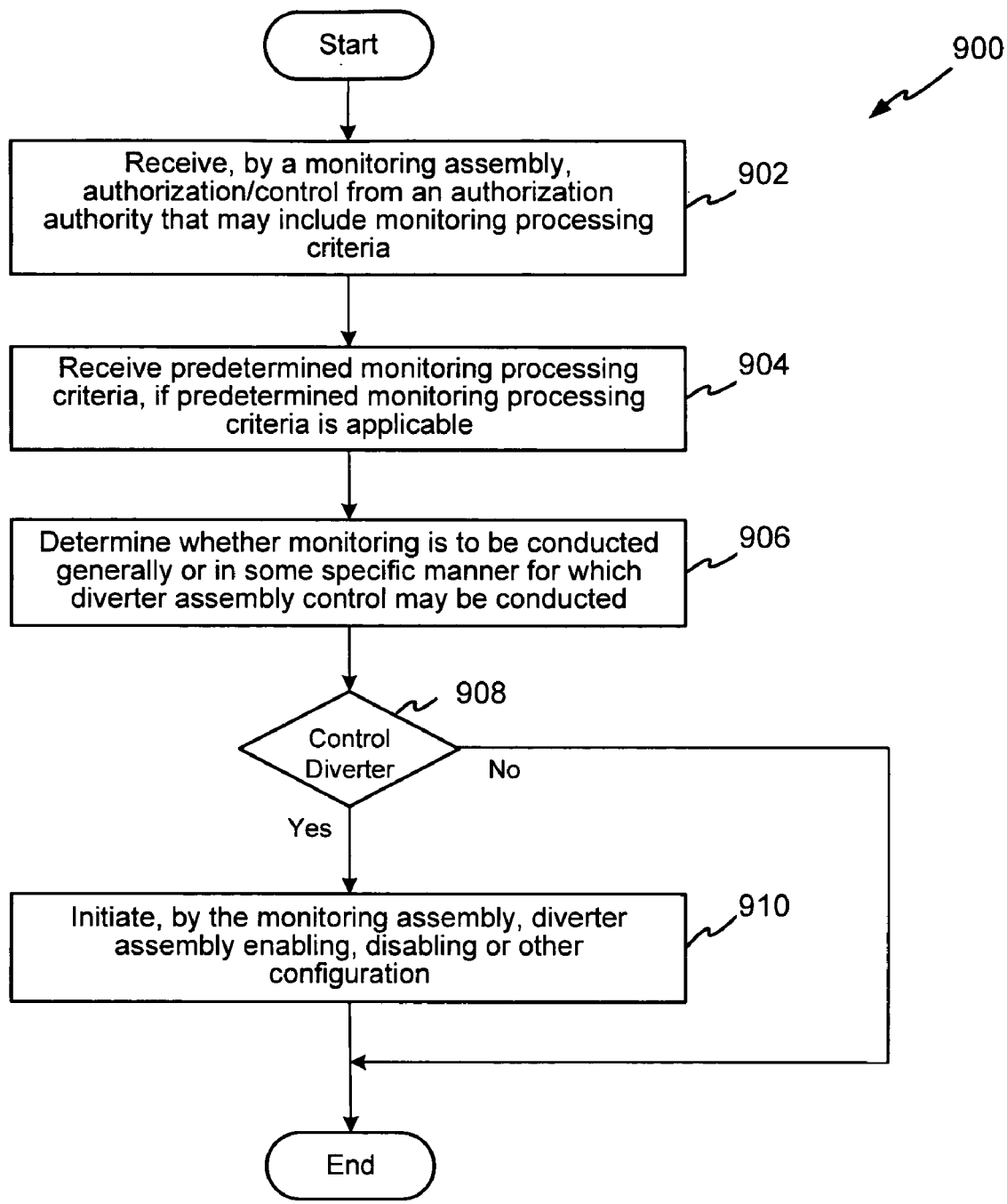
FIG. 9 is a flowchart illustrating a method for configuring a diverter assembly according to an embodiment of the invention.

The FIG. 9 flowchart illustrates a method 900 for configuring a diverter assembly according to an embodiment of the invention. In block 902, a monitoring assembly or other configuring device (hereinafter, monitoring assembly) may receive authorization for conducting transmission information monitoring that may further include monitoring processing criteria. The monitoring processing criteria may include criteria corresponding to that already discussed. In block 904, the monitoring assembly may receive predetermined monitoring processing criteria, e.g., other than criteria that may be received from a monitoring authorization authority. Such criteria may, for example, be received from a computer readable storage media, service host or other device. (It will be appreciated, however, that not all monitoring authorization, i.e., or requests, may include monitoring processing criteria, and not all monitoring may be associated with predetermined monitoring processing criteria.)

In block 906, the monitoring assembly determines whether monitoring is to be conducted or not in some specific manner for which diverter assembly control may be conducted. If, in block 908, diverter assembly control is to be conducted, then the monitoring assembly may conduct such control in block 910. As was discussed earlier, such control may, for example, include enabling/disabling diverter receiver or other diverter component operation, modifying such operation, and so on, in accordance with the requirements of a particular application.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system, comprising:
    a monitoring assembly; and
    an optical diverter assembly coupled to the monitoring assembly, the diverter assembly for receiving optical transmission information and producing therefrom diverted and non-diverted transmission information portions, the diverter assembly comprising:
    an optical assembly input;
    an optical assembly output;
    an electrical assembly output;
    an optical receiver including a receiver input and a receiver output;
    an optical splitter including a splitter input coupled to the optical assembly input, a first splitter output coupled to the optical receiver input and a second splitter output coupled to the optical assembly output, wherein the optical splitter is generally matched to the optical receiver for reducing signal loss at an optical splitter to optical receiver interface, wherein the monitoring assembly determines whether the diverted transmission information includes content criteria for designating particular transmission information to monitor in conjunction with other monitoring, and wherein the monitoring assembly is operable to modify at least one of a diverter frequency and a diverter state parameter; and
    a re-transmitter, wherein the re-transmitter raises a signal level of the non-diverted transmission information portion and outputs the non-diverted transmission portion.

2. A system according to claim 1, wherein the optical splitter is selected to output non-diverted transmission information having a signal strength that is substantially maximized yet still permits reliable receiver operation.

3. A system according to claim 1, wherein the optical splitter is selected to output diverted transmission information having a level of about 20 percent of received transmission information.

4. system according to claim 1, wherein the diverter assembly is configured for disposing the diverter assembly within the monitoring assembly.

5. A system according to claim 1, wherein the re-transmitter is disposed between the second splitter output and the optical assembly output.

6. A system according to claim 1, wherein the optical splitter is selected to output diverted transmission information having a level of up to a predefined percentage of at least one transmission frequency.

7. A method, comprising:
    disposing, within a diverter module, an optical receiver including a receiver input and a receiver output;
    disposing, within the diverter module, an optical splitter including a splitter input, a first splitter output and a second splitter output, wherein the optical splitter is generally matched to the optical receiver;
    coupling an optical diverter module input to the splitter input;
    coupling the first splitter output to the receiver input;
    coupling the second splitter output to an optical diverter module output;
    coupling the receiver output to an diverter module electrical output;
    coupling the diverter module to a monitoring assembly, wherein the monitoring assembly determines whether the diverted transmission information includes content criteria for designating particular transmission information to monitor in conjunction with other monitoring, and wherein the monitoring assembly is operable to modify at least one of a diverter frequency and a diverter state parameter; and
    coupling a re-transmitter to the second splitter output, wherein the re-transmitter raises a signal level of the non-diverted transmission information portion and outputs the non-diverted transmission portion.

8. A method according to claim 7, wherein the optical splitter is selected to output non-diverted transmission information having a signal strength that is substantially maximized yet still permits reliable receiver operation.

9. A method according to claim 7, wherein the diverter module is configured for disposing the diverter module within the monitoring assembly.

10. A method according to claim 7, wherein the optical re-transmitter is disposed between the second splitter output and the optical diverter module output.

11. A method according to claim 7, wherein the optical splitter is selected to output diverted transmission information having a level of up to a predefined percentage of at least one transmission frequency.

12. An network monitoring method, comprising:
    receiving, by an optical diverter assembly disposed on a network branch, transmission information transmitted via the optical network, the diverter assembly including an optical splitter coupled to an output stage, the output stage including at least one of an optical receiver which is coupled to a diverter assembly electrical output, the optical splitter being generally matched to the optical receiver, and a re-transmitter which is coupled to a diverter assembly optical output, the optical splitter being generally matched to the re-transmitter;
    diverting, by the optical splitter to the output stage, a first portion (diverted portion) of the transmission information to a monitoring assembly, wherein the monitoring assembly is operable to modify at least one of a diverter frequency and a diverter state parameter;
    determining, by the monitoring assembly, whether the diverted information includes designated content;

conducting monitoring processing, by the monitoring assembly, if the diverted information includes designated content;

outputting, by the optical splitter to the network branch, a further portion (non-diverted portion) of the received transmission information;

raising, by the re-transmitter, a signal level of the non-diverted transmission information portion; and outputting, by the re-transmitter, the non-diverted transmission portion.

13. A network monitoring method according to claim 12, further comprising transferring, by the optical receiver to the monitoring system via the diverter assembly output stage, diverted information corresponding to the diverted portion.

14. A network monitoring method according to claim 12, wherein the monitoring processing includes legal intercept monitoring processing.

15. A network monitoring method according to claim 12, wherein the monitoring processing includes network operation monitoring processing corresponding to operation of the network.

16. A network monitoring method according to claim 12, wherein the monitoring processing conducting comprises receiving, from a network component of the network, additional information corresponding to the information diverted by the diverting assembly.

17. A network monitoring method according to claim 12, wherein the optical splitter is selected to output diverted transmission information having a level of up to a predefined percentage of at least one transmission frequency.

18. A system, comprising:

an optical diverter assembly disposed on a network branch, for receiving a transmission signal transmitted via the optical network, the diverter assembly including:

an optical splitter;

an optical receiver coupled to the optical splitter; and an electrical diverter assembly output coupled to the optical receiver, the optical splitter being generally matched to the optical receiver, wherein the optical splitter via the optical receiver diverts a first portion (diverted portion) of the transmission signal to a monitoring assembly, wherein the monitoring assembly determines whether the diverted transmission information includes content criteria for designating particular transmission information to monitor in conjunction with other monitoring, and wherein the monitoring assembly is operable to modify at least one of a diverter frequency and a diverter state parameter, and wherein the optical splitter to the network branch outputs a further portion (non-diverted portion) of the received transmission signal; and a re-transmitter, wherein the re-transmitter raises a signal level of the non-diverted transmission information portion and outputs the non-diverted transmission portion.

19. A system according to claim 18, wherein the optical splitter is selected to output diverted transmission information having a level of up to a predefined percentage of at least one transmission frequency.

* * * * *